Jan. 25, 1927. 1,615,806
L. A. WATTERS ET AL
ACCOUNTING MACHINE
Filed Jan. 19, 1920  15 Sheets-Sheet 3
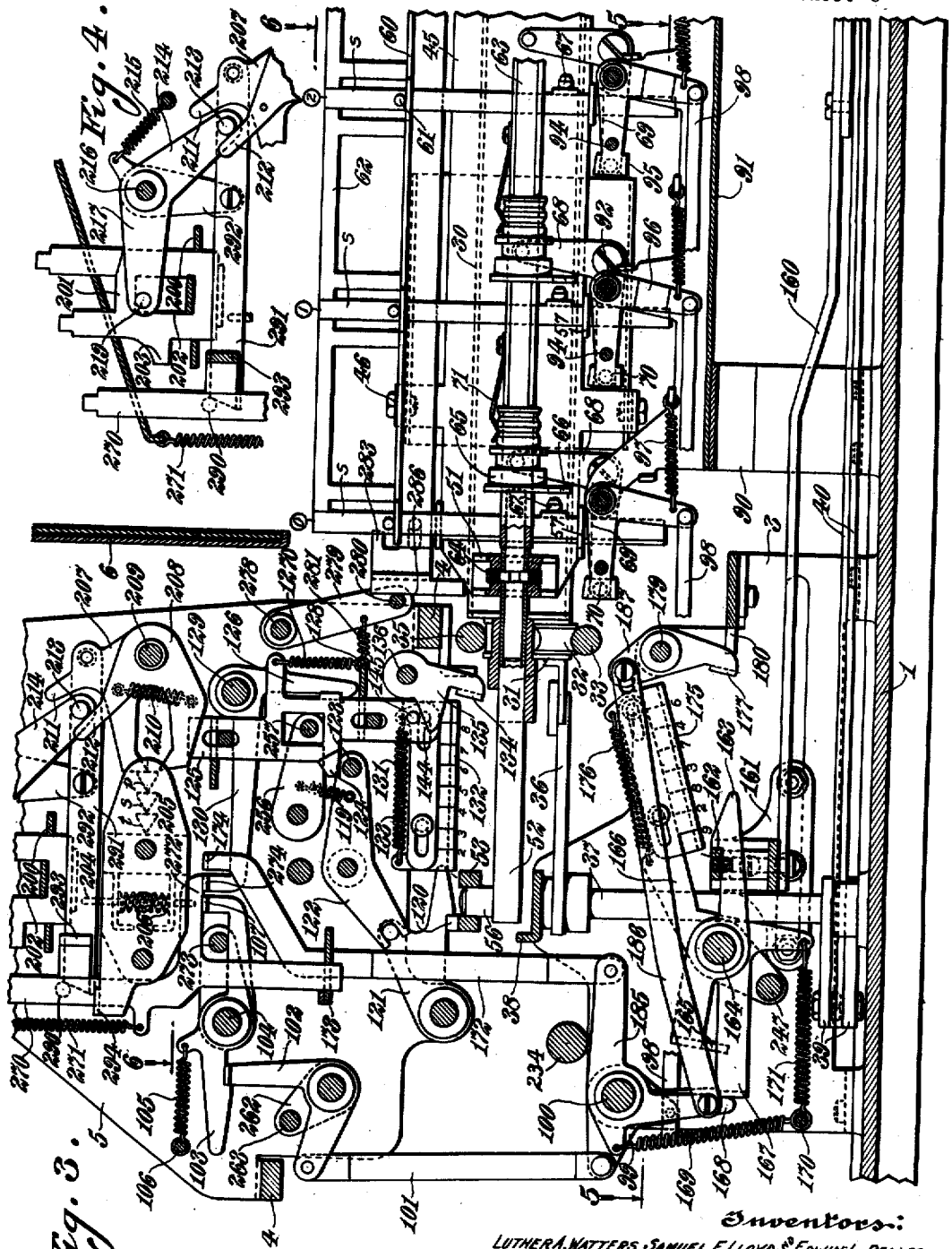
Inventors:
LUTHER A. WATTERS, SAMUEL F. LLOYD and EDWIN L. RELLER,
By John H. Bruninga
Their Attorney.

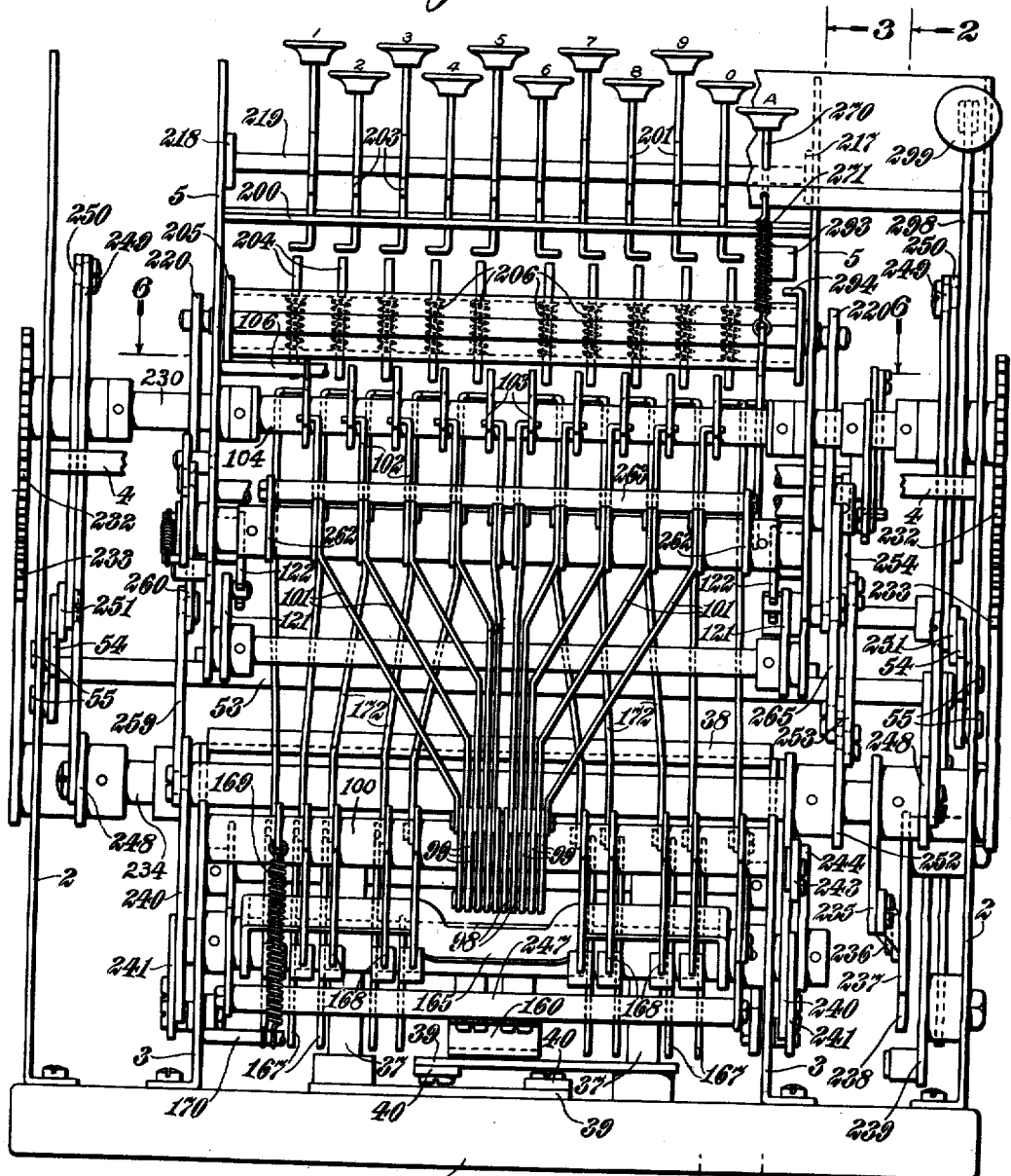

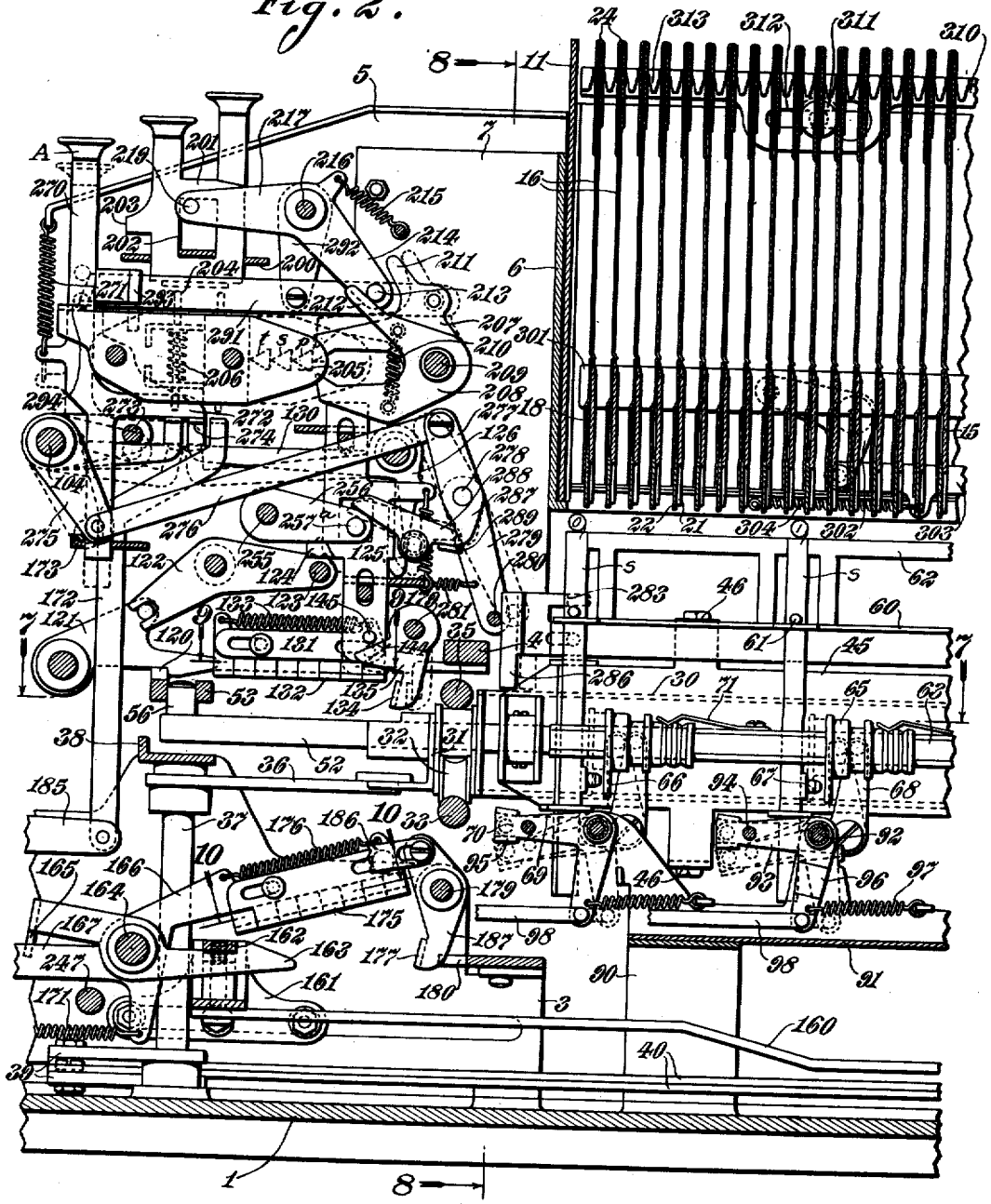

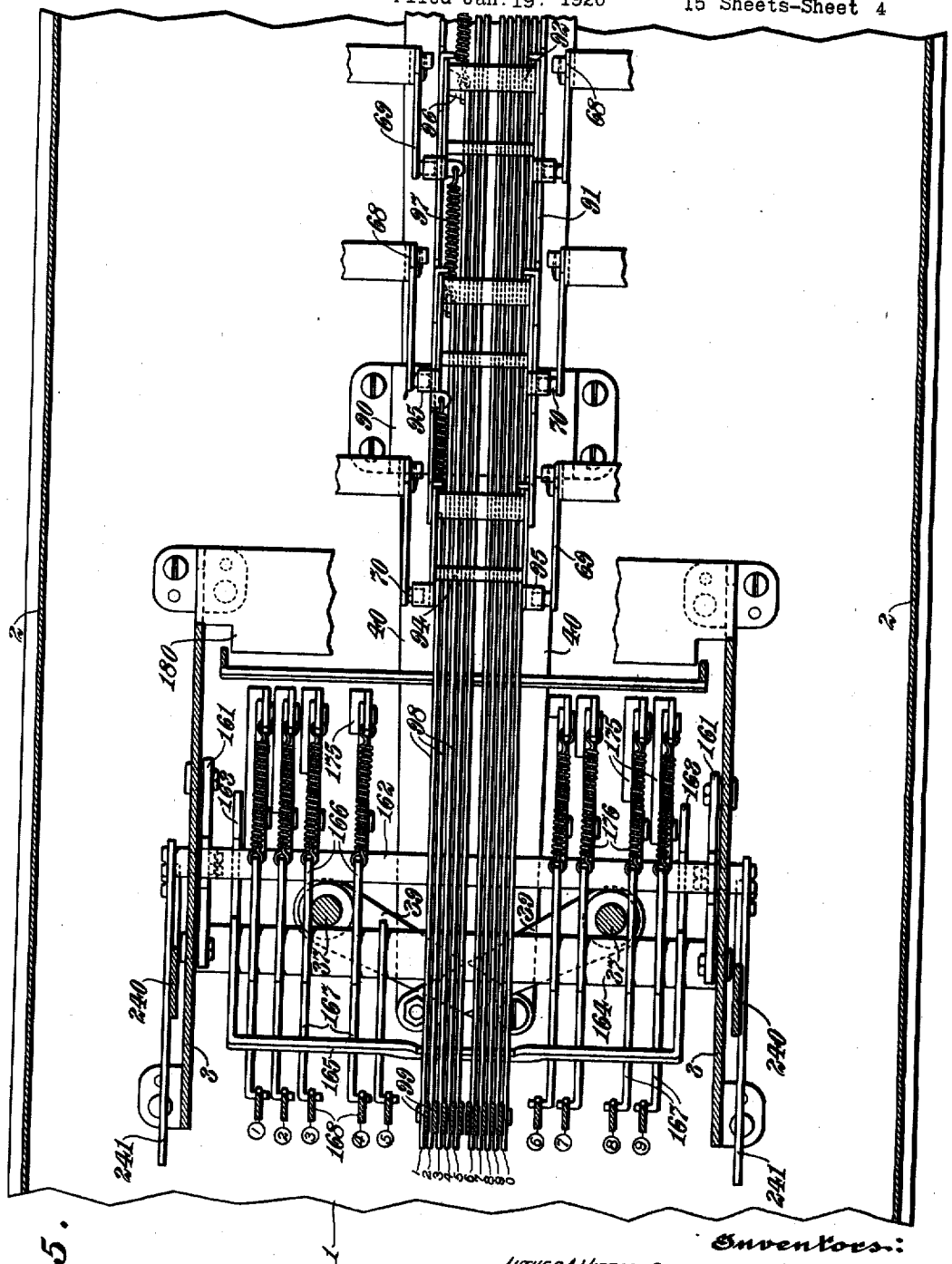

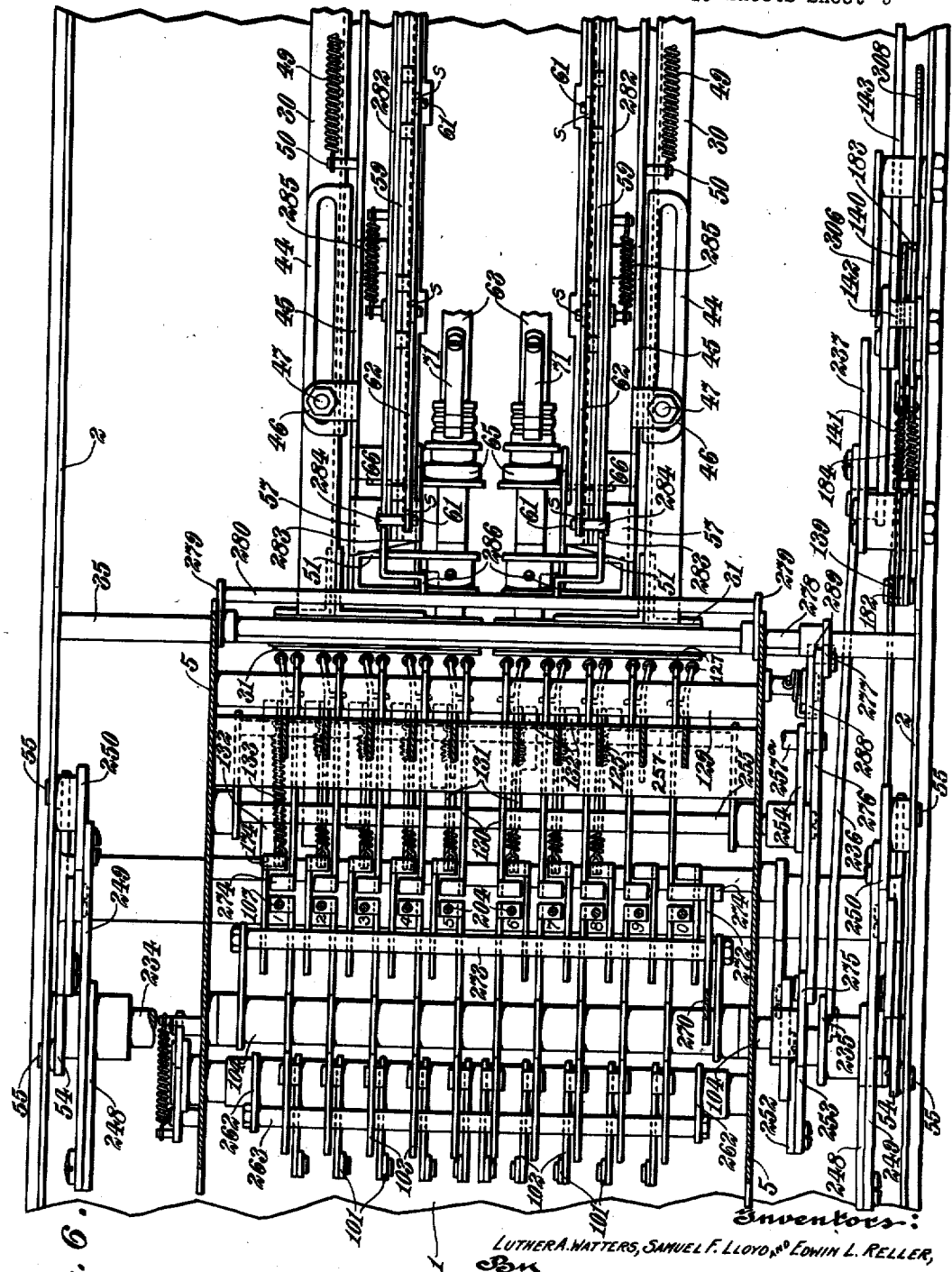

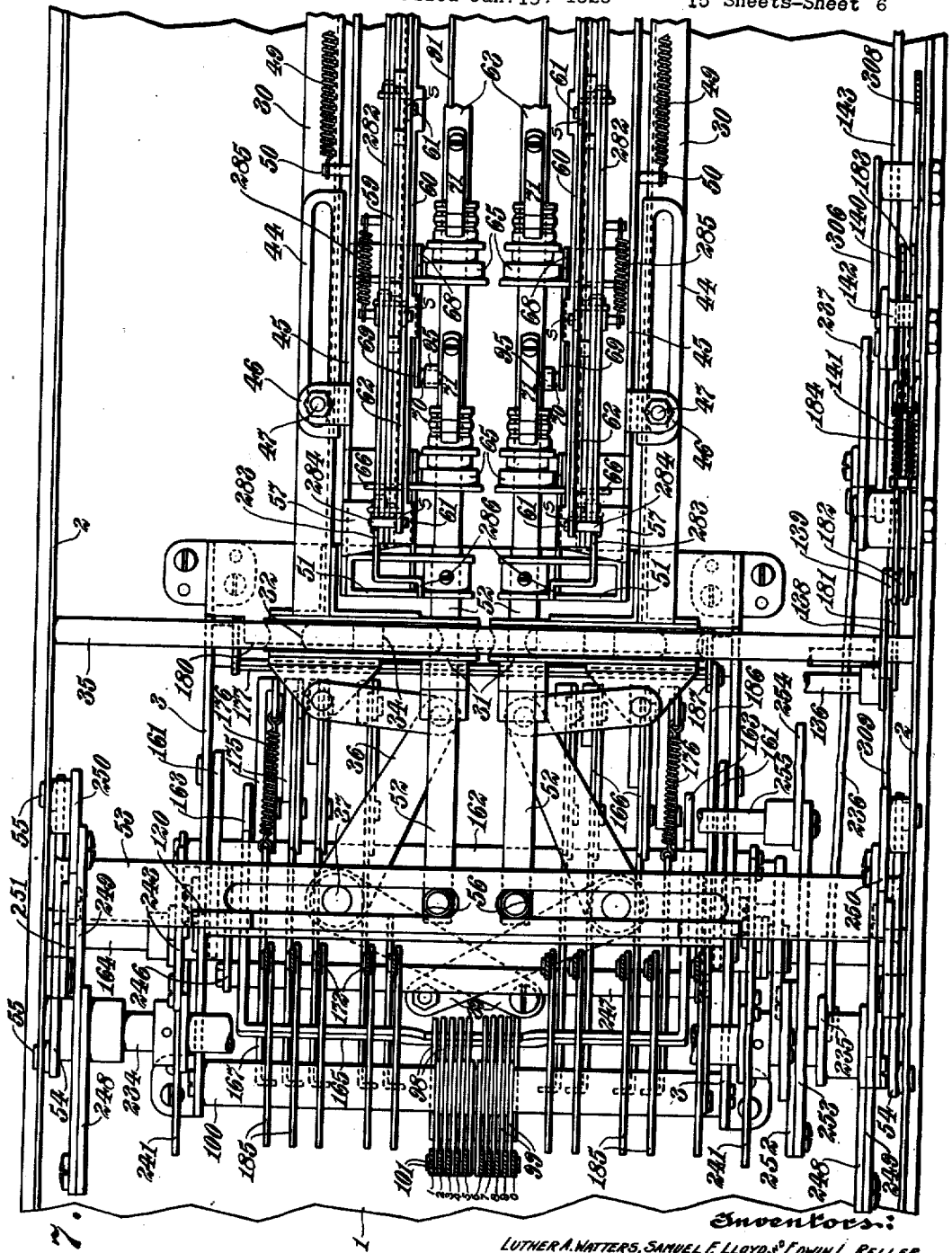

Jan. 25, 1927. 1,615,806
L. A. WATTERS ET AL
ACCOUNTING MACHINE
Filed Jan. 19, 1920 15 Sheets-Sheet 7

Inventors:
LUTHER A. WATTERS, SAMUEL F. LLOYD & EDWIN L. RELLER,
By John H. Bruninga
Their Attorney.

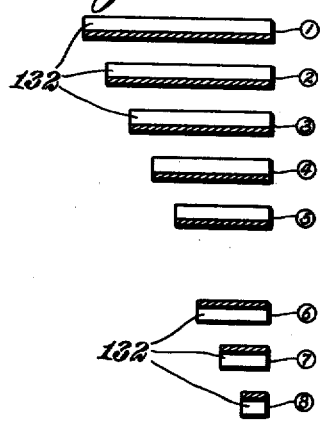
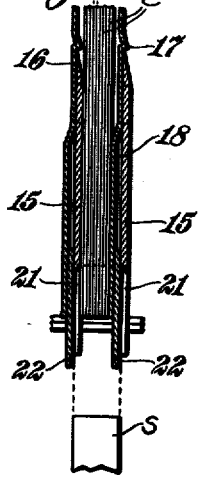
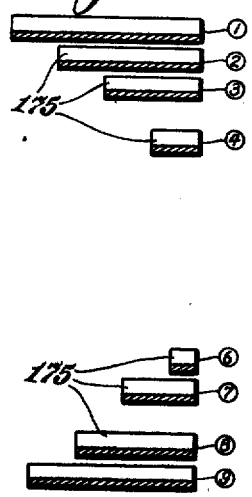
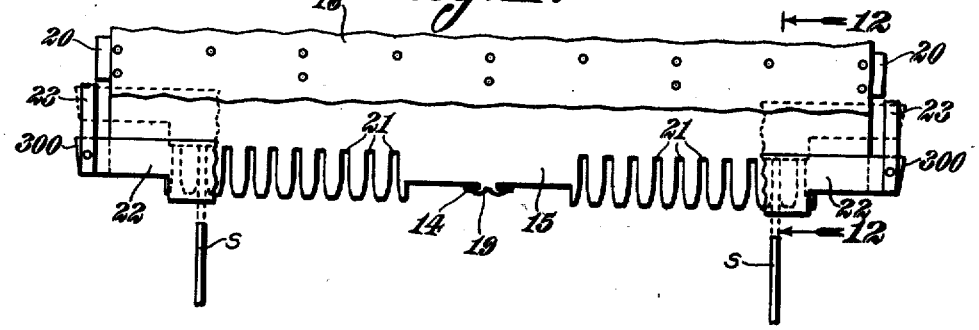
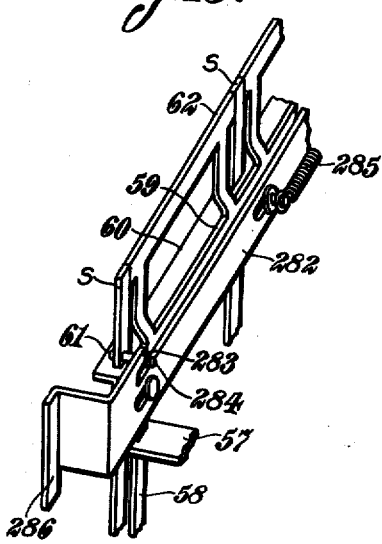
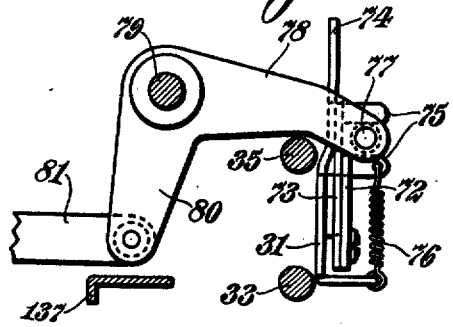

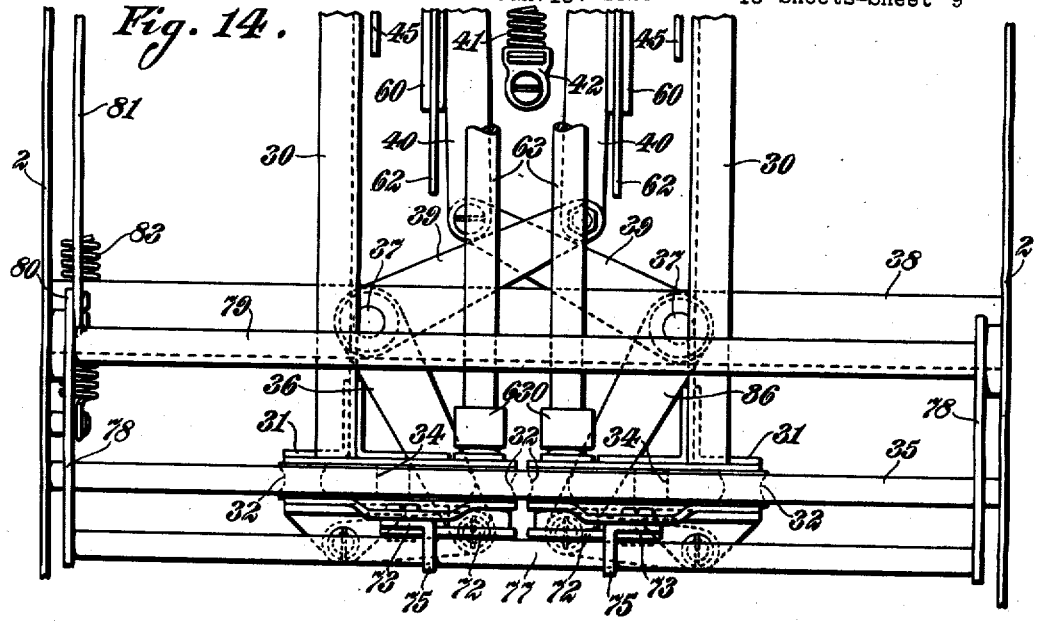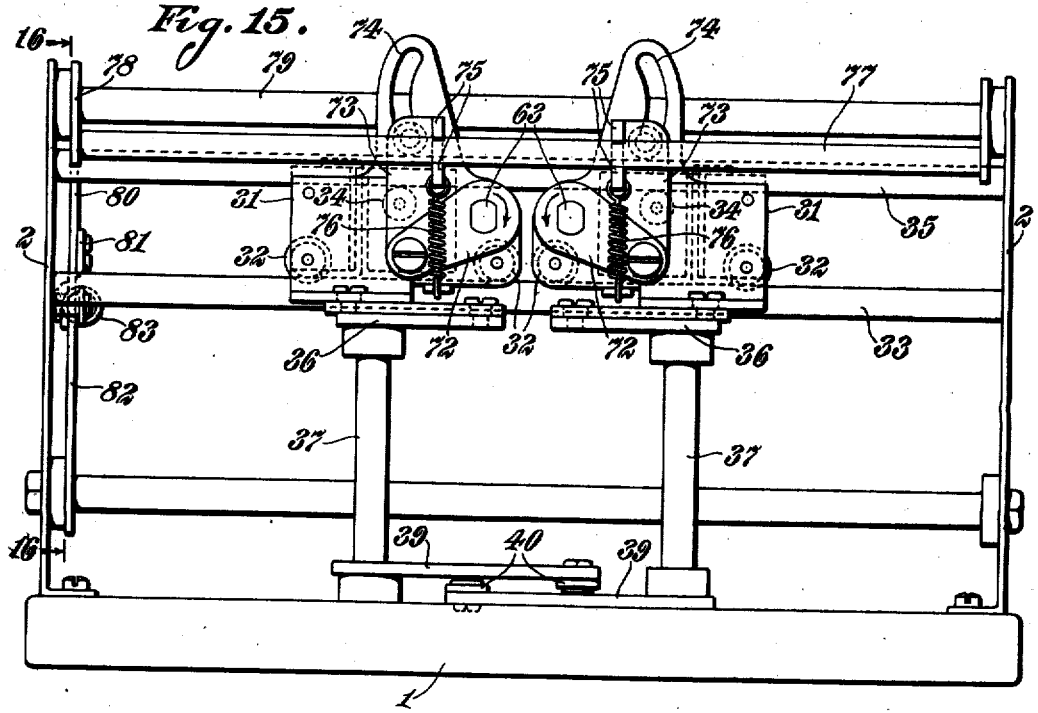

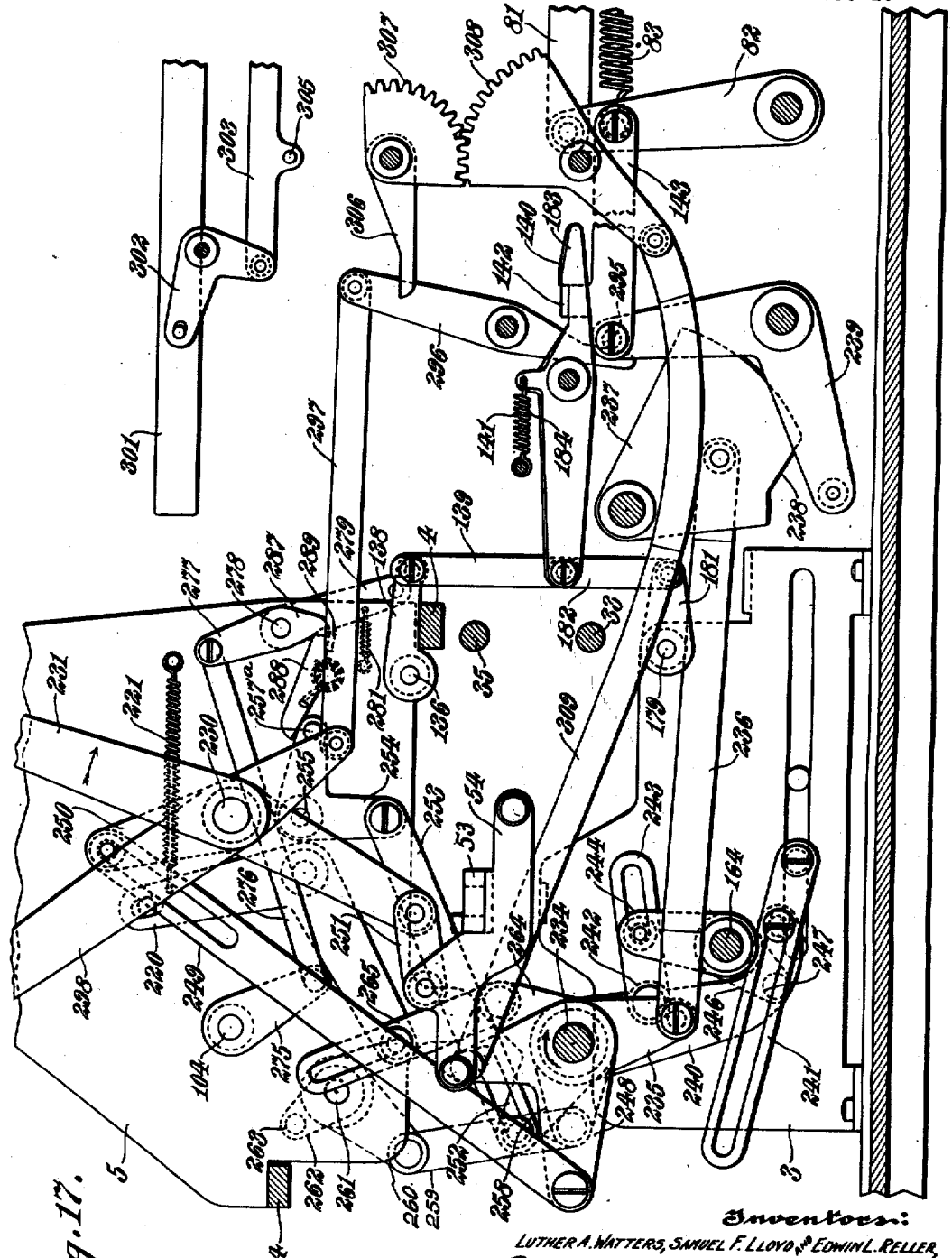

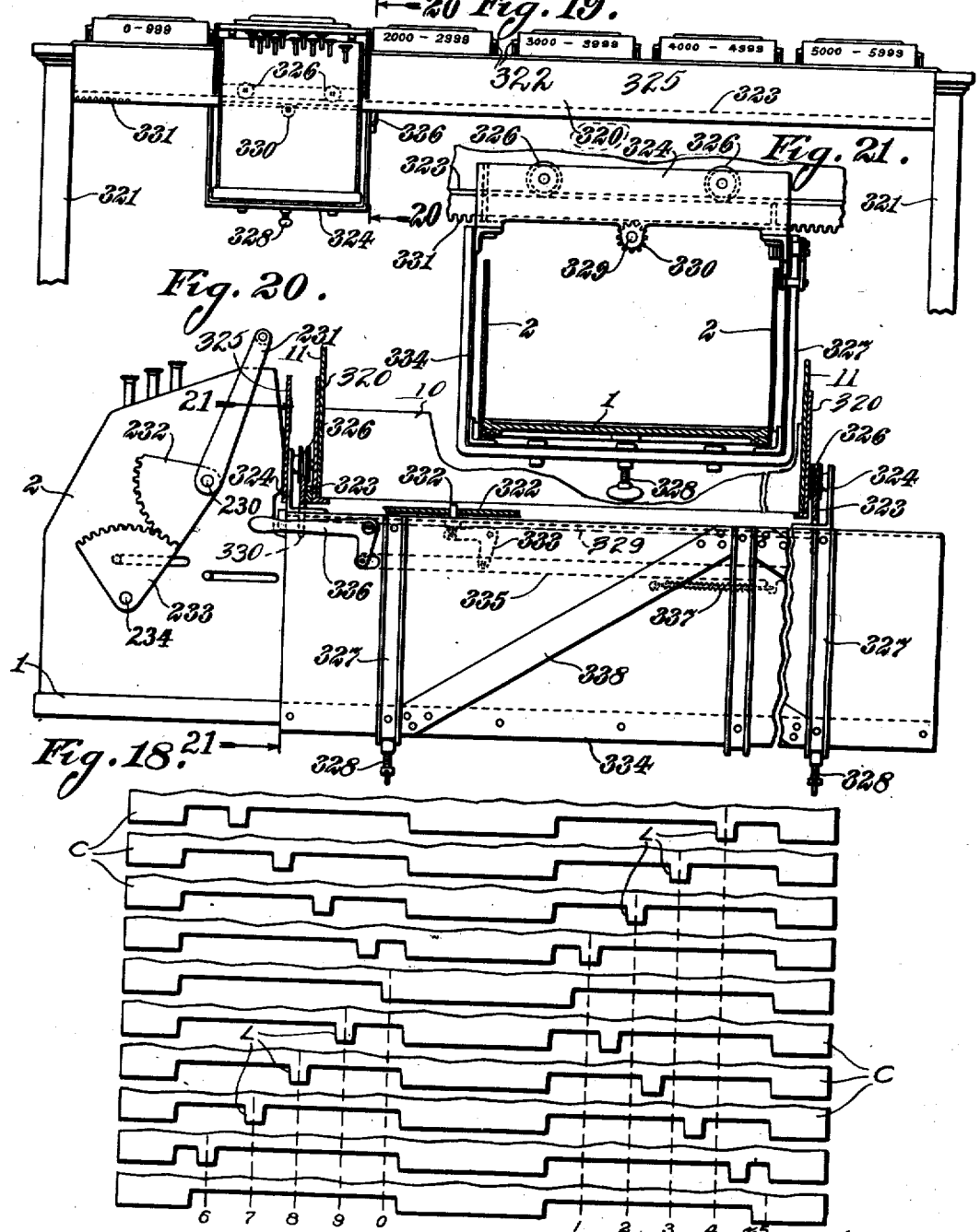

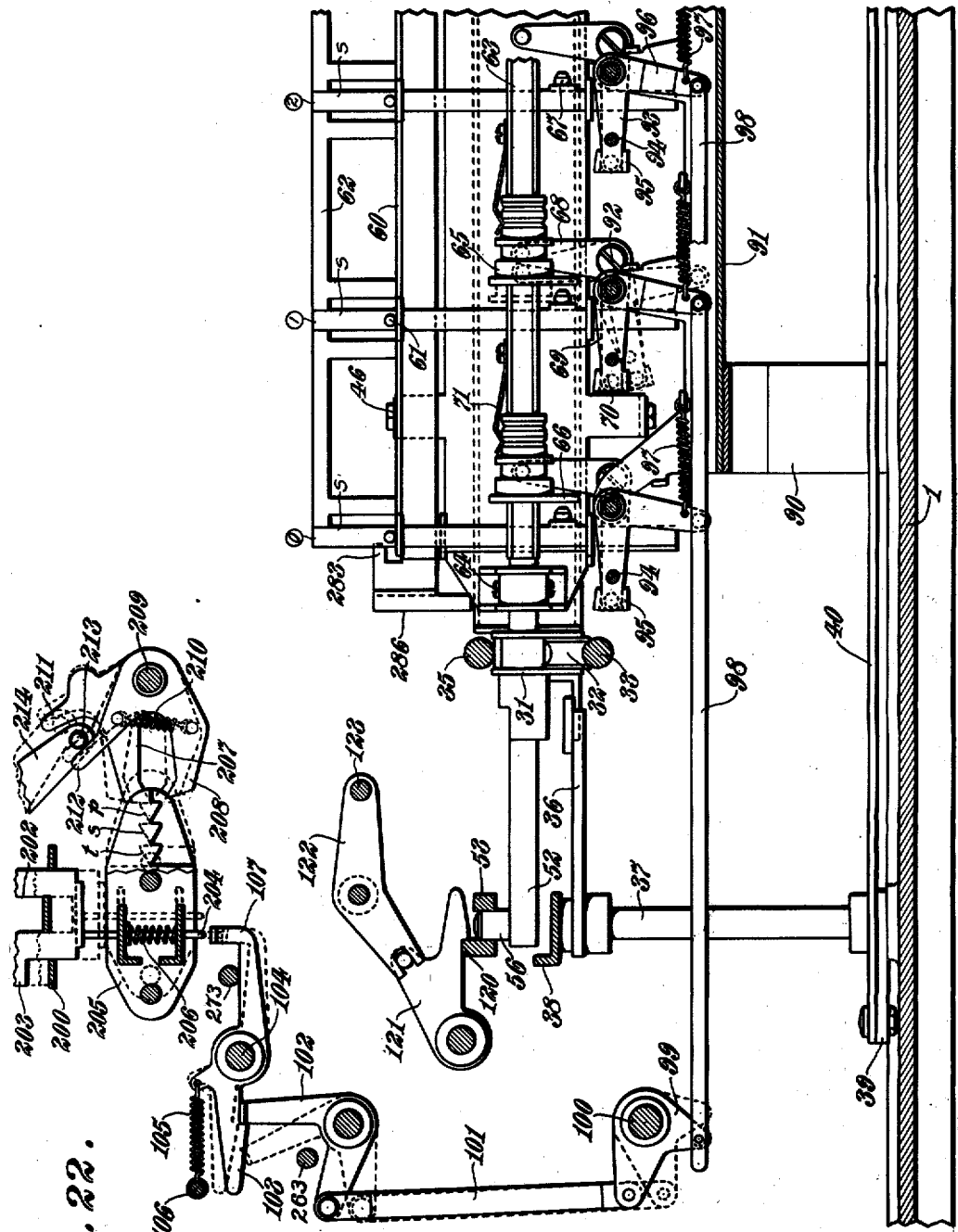

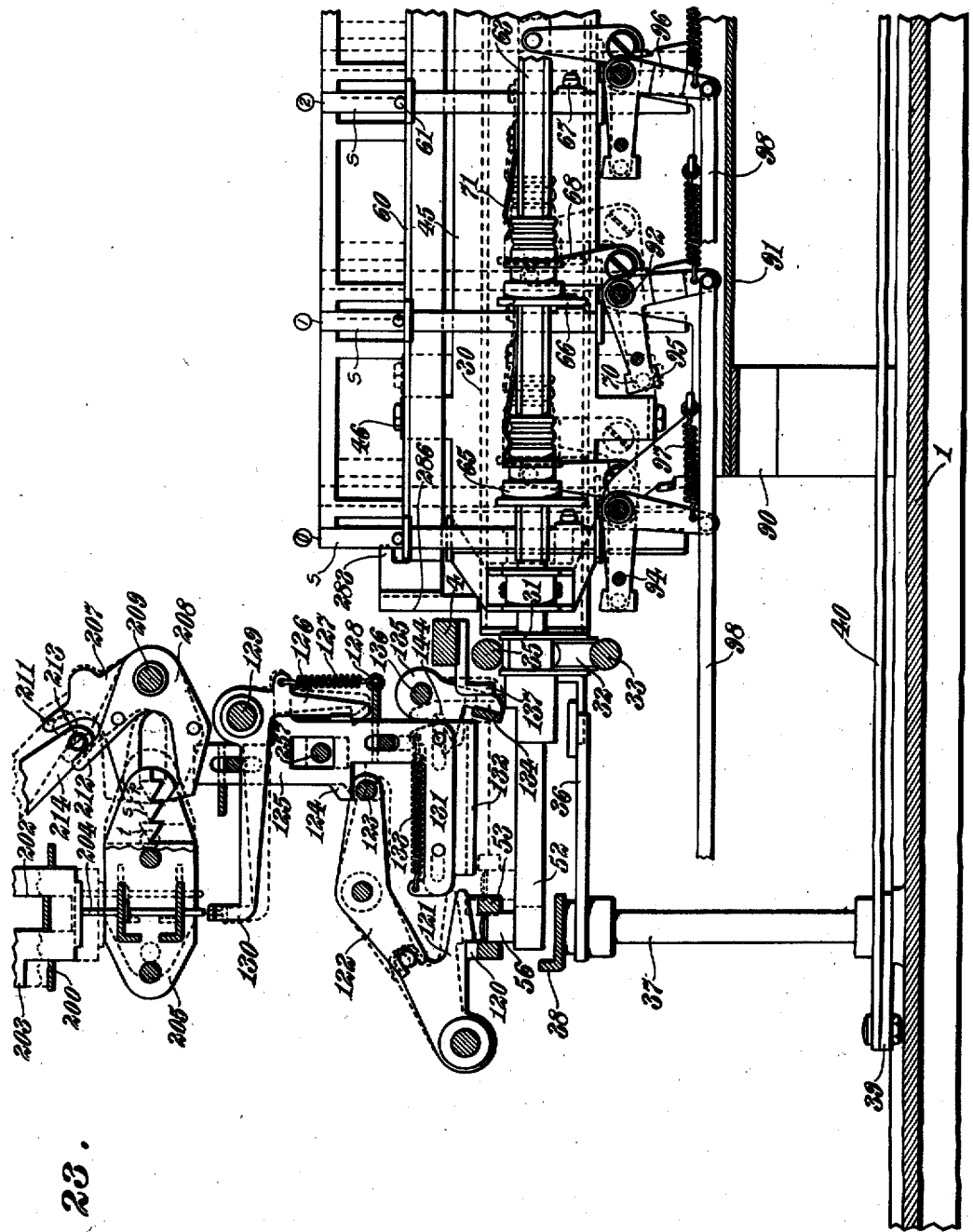

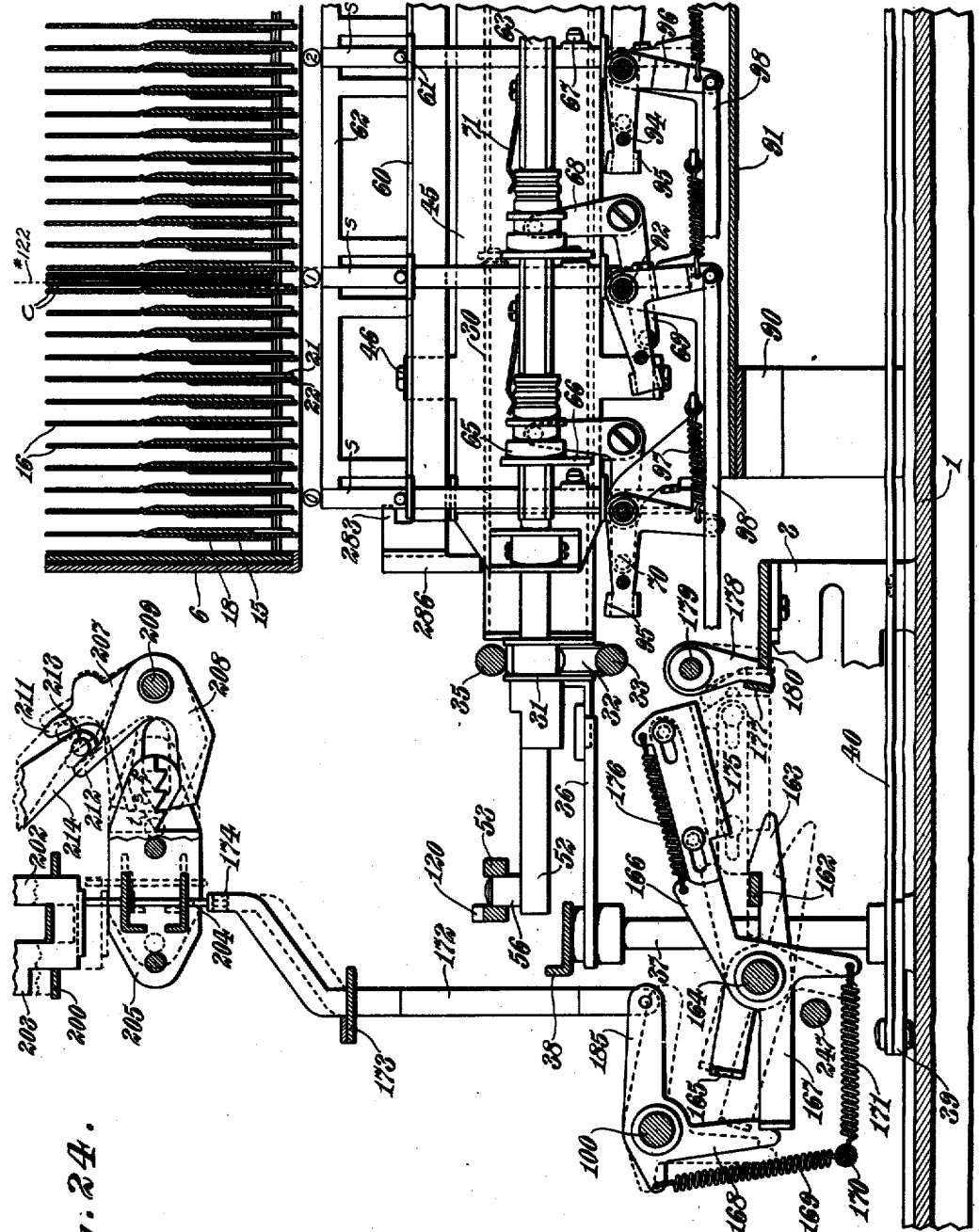

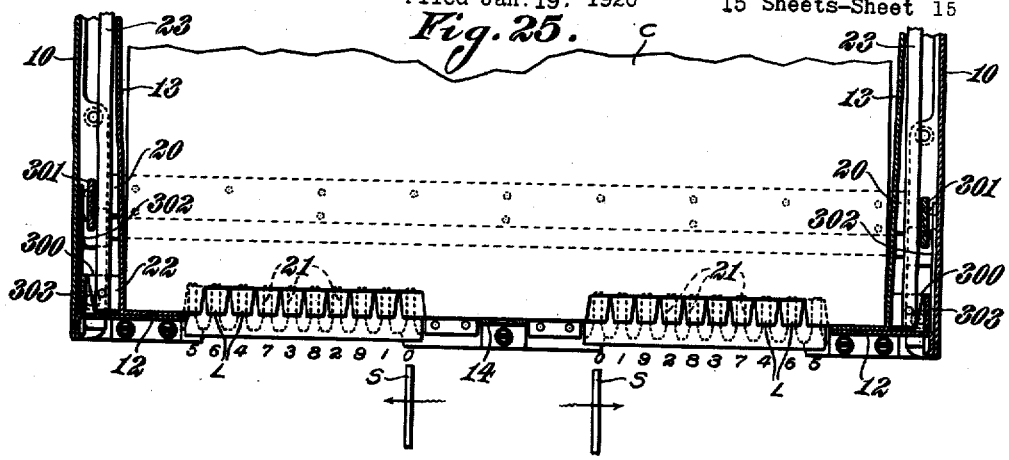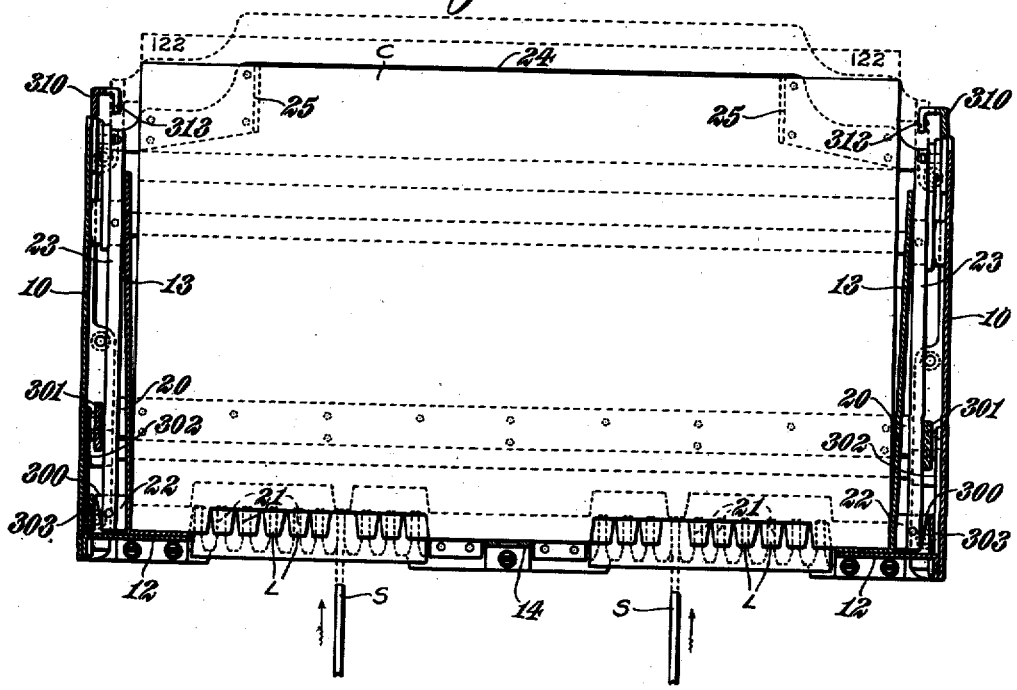

Patented Jan. 25, 1927.

1,615,806

UNITED STATES PATENT OFFICE.

LUTHER A. WATTERS, SAMUEL F. LLOYD, AND EDWIN L. RELLER, OF ST. LOUIS, MISSOURI, ASSIGNORS TO LIBERTY SYSTEMS CORPORATION, OF WILMINGTON, DELAWARE, A CORPORATION OF DELAWARE.

ACCOUNTING MACHINE.

Application filed January 19, 1920. Serial No. 352,601.

This invention relates to an accounting apparatus and machine and more particularly to a machine adapted for the finding of accounts.

In the accounting machine and system described in British Patent No. 153,344, Nov. 2, 1920, the desired account is found by a series of steps comprising primary, secondary and tertiary operations, in accordance with a given system of classification, such as the numerical or decimal system. Accordingly, the account cards are arranged in a tray or trays and each tray is divided into groups, the groups divided into divisions and the divisions divided into cards. Accordingly, in order to effect selection of a given account by the successive operation of selective manipulative elements or keys, the selectors employed are primarily located to locate a group, secondarily located to locate a division of the located group, and tertiarily located to locate the desired card in the located division. The selectors are then operated to isolate the finally located card.

The cards of a unit or division have selective characteristics variantly arranged along the edges thereof, such as the bottom edges so as to permit cooperation therewith of the selectors, in order to effect location and selection of any individually desired card in the unit or division.

Now in a machine or apparatus of the class described, it is necessary to not only aline the selectors with the desired unit, but also with the characteristics of the desired card in the selected unit.

One of the objects of this invention, therefore, is to provide an accounting apparatus in which the selectors when located are insured of cooperation with the selective characteristics of the desired card in the desired unit or division.

Another object of this invention is to provide the tray of the accounting apparatus or machine with means for guiding the selectors into engagement with the characteristics of the desired card of the desired unit.

In the accounting apparatus of the character described, the divisions or units are provided with pilots which are isolated so as to indicate the unit or division from which a card has been withdrawn or in which a card is to be replaced.

Another object of this invention, therefore, is to improve the construction of such pilot mechanism so as to positively effect isolation of the pilot, and so as to positively return the pilots to normal positions.

In the apparatus of the character described, it is desirable and even necessary to provide a series of selectors corresponding to the several groups, and the primary operation is to render effective the desired selector in order to locate this selector with respect to a desired group. Thereafter the selectors, which are mounted on a carrier, must be shifted along and transversely of the tray to effect the secondary and tertiary locations, and the effective selectors must then be actuated to isolate the desired and finally located card.

Another object of this invention, therefore, is to improve the primary mechanism in order to simplify the construction and in order to more effectively render effective for actuation the desired selector.

Another object is to improve the mechanism for positioning the selectors along and transversely of the tray so as to render the selector location more definite and certain.

In a machine of the character described in order to audit the accounts, audit mechanism is provided which is adapted to isolate corresponding cards in all of the units or divisions and ending in a given number. This is accomplished by eliminating the secondary location and interconnecting all of the selectors, so as to present selector bars extending along the tray, which upon tertiary location locate all of the cards ending in a certain number and isolate all of them as well as the pilots for all of the units.

Another object of this invention, therefore, is to improve the audit mechanism so as to render more positive and certain its action and so as to condense and simplify the construction.

Where the accounts are arranged in a series of trays as in the apparatus described, the selecting mechanism is shifted from tray to tray.

Another object of this invention, therefore, is to improve the multiple tray construction, so as to permit accurate location of the selecting mechanism and its selectors with respect to any desired tray and the cards therein.

Further objects will appear from the detail description taken in connection with the accompanying drawings, in which:

Figure 1 is a front elevation of a machine embodying this invention;

Figure 2 is a longitudinal vertical section on the line 2—2, Figure 1, showing part of the mechanism in elevation;

Figure 3 is a view similar to Figure 2, but on the line 3—3, Figure 1;

Figure 4 is a detail of Figure 2, and showing more particularly the audit mechanism;

Figure 5 is a section on the line 5—5, Figure 3, showing the primary mechanism for rendering a chosen pair of selectors effective for actuation;

Figure 6 is a section on the line 6—6, Figure 3, showing the secondary mechanism;

Figure 7 is a section on the line 7—7, Figure 2, showing the tertiary mechanism;

Figure 9 is a section on the line 9—9, Figure 2, showing the secondary stops;

Figure 10 is a section on the line 10—10, Figure 2, showing the tertiary stops;

Figure 11 is a detail of the tray, showing the guides for the selectors;

Figure 12 is a detail of Figure 2, showing a further detail of the tray;

Figure 13 is a detail perspective view showing the mounting of the selectors and audit bars;

Figure 14 is a detail plan of the rear end of the machine showing the mechanism for laterally positioning the selectors;

Figure 15 is an elevation of Figure 14;

Figure 16 is a section on the line 16—16, Figure 15;

Figure 17 is a detail side elevation, partly in section, showing the restoring mechanism;

Figure 18 is a detail of the cards or accounting elements of a unit;

Figure 19 is a front elevation showing a series of trays and mechanism for cooperating therewith;

Figure 20 is a section on the line 20—20, Figure 19, showing the mechanism in elevation;

Figure 21 is a section on the line 21—21, Figure 20;

Figure 22 is a detail showing the mechanism for effecting primary selection;

Figure 23 is a detail showing the mechanism for effecting secondary selection;

Figure 24 is a detail showing the mechanism for effecting tertiary selection and isolation;

Figure 25 is a detail showing the selectors in normal position; and

Figure 26 is a detail showing the selectors in full lines in tertiary position as shown in full lines, Figure 24, and in isolating position, as shown in dotted lines, Figure 24.

Figure 8:
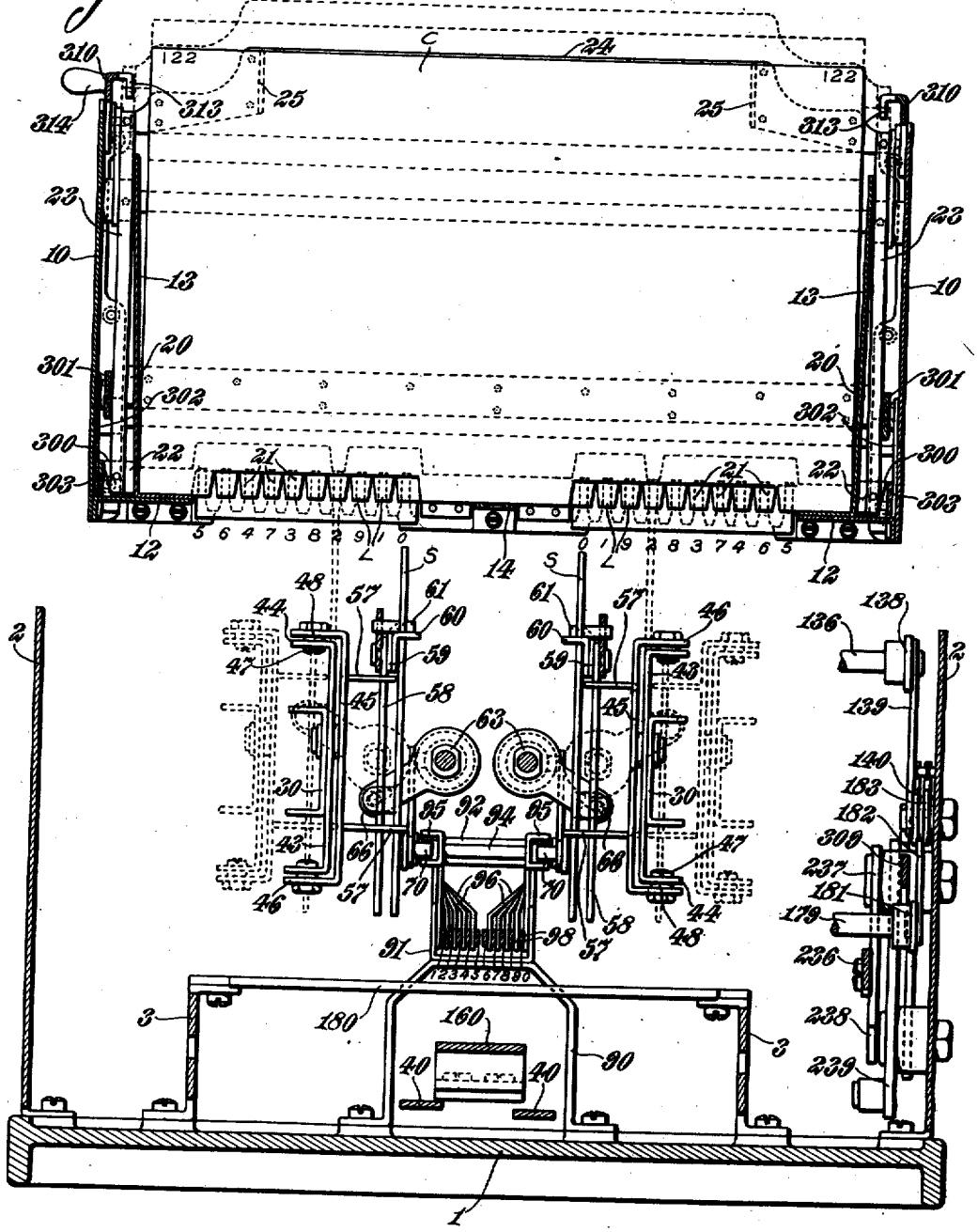
Figure 8 is a section on the line 8—8, Figure 2, showing the selectors and their positioning and actuating mechanism.

In many of the views, parts have been omitted; this has been done to permit clearness, for if all of the parts behind a plane at which a view is taken were shown, they would obscure the particular mechanism under consideration.

In the specification and claims, the term "card" is used in its broadest sense so as to cover ordinary loose leaves, cards, sheets and other accounting elements. Similarly, the word "tray" is used in its broadest sense so as to include the various forms of holding means adaptable for the holding, retaining or segregation of accounts.

*Frame work.*

Referring to Figures 1, 2, 8, 15 and 17, 1 designates a base which has mounted thereon a pair of sides 2 and brackets 3, the sides and brackets being suitably connected by side bars so as to form a rigid structure. Two of such side bars are shown at 4 which support plates 5 also suitably connected by cross bars. A plate 6 having flanges 7 is supported between the sides 2.

*The tray.*

Referring to Figures 2, 8, 11 and 12, 10 designates a pair of side plates which are connected at their forwards ends with a plate 11 and at their rear ends with a similar plate (not shown). Strips 12 extend along the machine and these strips are provided with flanges for connecting the same with the sides and ends 10 and 11. Side plates 13 have flanges connecting the same with the strips 12 and these plates are connected with the ends 11 so as to form the sides proper of the tray and so as to provide ledges. It will be noted that these sides 13 flare upwardly for a purpose hereinafter to be described. Connecting the ends 11 is a strip 14 which extends centrally along the tray.

A series of cross pieces 15 extend transversely of the tray and are attached to sheet metal plates 16 which are riveted to the cross pieces 15 located thereon by ribs 17 and spaced outwardly therefrom to form recesses 18. These cross pieces 15 have lugs 19 entering slots in the strip 14 and riveted over so as to secure them in position, while cross pieces 15 are also provided with ears 20 entering slots in the side plates 13.

The tray is thus divided into a series of compartments (in this case, one hundred) by the partitions 16, which being attached at their lower ends and free at their upper ends are susceptible of flexure in a direction along the tray. The cross pieces 15 are slotted at 21 to form a comb structure comprising, in this case, ten slots symmetrically spaced on each side of the median line of the tray, and it will be noted that the entrances to these slots are flared. The slots are of a width equal to the thickness of the selectors S hereinafter to be described, while the sides of the slots are in the paths of movement of the selectors so as to guide these selectors into the compartment with which these selectors may be in alinement and so as to guide these selectors in the transverse positions in which they may be located.

The pilots.

Referring to Figures 2, 8, 11 and 12, slidable in each recess 18, between a cross piece 15 and the partition 16 is a bar or plate 22, the ends of which slide in slots in the side plates 13 and are connected with vertical bars 23 connected at their upper ends with a plate 24 folded over and slidable on the upper ends of the partition 16, the connection between 23 and 24 being made through the medium of pieces 25.

There is provided such a structure for each compartment and each partition, and accordingly the plate 22 for a compartment is in the path of a pair of selectors S when in alinement with that compartment so that upon elevation of the selectors, the latter will engage the plates 22 and raise the plate 24 above its normal position. The plate 24, therefore, acts as a pilot to indicate the position of the compartment.

The cards.

In accordance with this embodiment of this invention, the cards are arranged in accordance with the numerical or decimal system of classification. Accordingly, the tray of one thousand cards is divided into ten groups of one hundred cards each; each group is in turn divided into ten divisions of ten cards each; and each division is divided into ten cards. Accordingly, each compartment is adapted to receive ten cards. Now in effecting selection of a desired card, the procedure is by primary, secondary and tertiary selections, and an isolation of the desired card after the tertiary selection. The primary selection is one of location of the group containing the account; the secondary selection is one of location of the division in the selected group containing the desired account; and the tertiary selection is one of location in the selected division of the desired account. In accordance with this invention the primary location is of a group of compartments, while the secondary location is of a compartment in the located group; in order, however, to locate a desired card, it is necessary to locate a card in the located compartment. The location of a series of compartments and of a compartment can be obtained by a relative adjustment or location along the tray; this method of selection cannot, however, be used in order to locate a desired card because the thickness of the card is too small to permit of such adjustment.

In accordance with this invention, therefore, a unit or division of cards contained in a compartment has selective characteristics arranged at variant positions along the edges of the cards corresponding to the positions of the cards in the unit, division or compartment. Accordingly, the tertiary location can be obtained by transverse shifting of the selectors along the card edges.

Referring to Figures 2, 8, 11, 12 and 18, C designates one of a unit of cards which has selective characteristics L along the bottom edge thereof and corresponding respectively to the positions of the cards in the unit. Since there are ten cards, there are ten positions of the selective characteristics as indicated and shown in Figure 18. The selective characteristics are, however, duplicate on opposite sides of the median line, these selective characteristics being symmetrically arranged so as to adapt the same for concurrent cooperation with a pair of selectors S. In view of the fact that the cards of one unit will correspond as to their selective characteristics with the cards of every other unit, it is entirely obvious that the number of different cards in a numerical or decimal system will never exceed ten.

Assuming that it is desired to locate and isolate a desired card in a unit, which, for instance, is card No. "6"; when the selectors S have been moved to the "6" position, Figure 11, so as to be in alinement with the "6" locations or characteristics L, and when the selectors are, at this time, elevated, the result will be an elevation only of the "6" card in that unit, while all of the other cards will be undisturbed, as their selective characteristics are not in cooperative relation with the selectors. As the selectors, however, rise, they will concurrently raise the pilot for that compartment by cooperation with the plate 22. Accordingly, the desired card together with its pilot is raised in the compartment. It will be noted that on account of the flared construction of the slot entrances 21, the selectors S will be guided into the compartment and in proper cooperative relation with respect to the characteristics even if the positioning of the selectors does not locate them in accurate alinement with the characteristics.

The selector carriage.

Referring to Figures 2, 5, 7, 8, 13, 14, and 15, 30 designates a pair of side bars of channel-form, each of which has at both ends thereof, cross heads 31, each of which is provided with a pair of grooved rolls 32 engaging one of the lower guide bars 33 and with a plain roll 34 engaging one of the upper guide bars 35 mounted between the side plates 2. The side bars 30 are thus mounted for transverse movement towards and from each other.

Each cross head 31 is connected by a link 32 with an arm 36 mounted on the upper end of a rock shaft 37 supported at its lower end on the base 1 and at its upper end by a cross-bar 38. The lower end of the rock shaft 37 has fixed thereto an arm 39 connected with a link 40 extending along the frame. There are pairs of cross-heads, arms and rock shafts supported at each end of the frame and the links 40 are connected at about the center of the machine (not shown) and it will be further noted that the arms 39 at each end cross one another so that a link 40 of one arm at one end of the machine is connected with the corresponding arm at the other end of the machine so as to comprise a parallel movement whereby longitudinal movements of the links 40 in unison will cause the side bars 30 to move towards and from each other while remaining parallel. The links are connected at the center of the machine by a cross-head (not shown) to which these links are pivoted as in the machine of British Patent 153,344, and this cross-head is connected with one end of a strong spring 41, Figure 14, the other end of which is connected with an anchor 42 fixed to the base 1. The spring, therefore, operates to spread the side bars 30 apart, while these side bars are normally retained in inward position, as shown in the figures, by latches as hereinafter described.

*The selector carrier.*

Mounted towards the forward end of each side bar is a bracket 43 which has upper and lower slotted flanges 44. Extending along and inside of each side bar 30 is a supporting bar 45 which has outwardly turned lugs 46 overlying the flanges 44. A screw 47 passes through each flange 44 and the corresponding lug 46, the head of the screw lying against the inner face of the flange 44, while the head engages the outer face of the lug 46, and a spacing washer 48 is interposed between the flange and the lug. There is a series of flanges, lugs and connections for each side bar and supporting bar, one set at each end and also one or more in the center (not shown). Accordingly, the supporting bars 45 are arranged for longitudinal movement along the side bars. Each side bar has anchored thereto a spring 49 which connects with a pin 50 on the supporting bar so as to normally tend to move the supporting bars rearwardly, but these supporting bars are sustained against the tension of these springs by latches as hereinafter described.

Each supporting bar 45 has an inwardly extending head 51 fixed to a shank 52 extending forwardly through and slidingly mounted in the cross-head 31 and underneath the cross-bar 53 which is mounted for sliding movement along the machine by being provided at each end with a head 54 having pins or rollers 55 sliding in slots in the side plates 2. Each shank 52 has a roll 56 engaging slots in the cross-bar 53 thereby permitting transverse movements of the shanks 52 with the supporting bars 45 and the side bars 30, while maintaining the connections with the cross-bar 53.

Each supporting bar 45 has at its forward end supporting lugs 57, the lower one of which extends beyond the upper one. These lugs are slotted to receive a shank 58 connected with a side plate 59. This side plate 59 extends along and inside of the supporting bars 45 and is provided with a series of these shanks 58, one at each end and one or more intermediate (not shown), there being also a series of supporting lugs 57, arranged along the side bar 45 to cooperate with the shanks 58. The plate 59 has fixed thereto a flanged guide plate 60 which extends along and inside of the plate 59, in practice, the shanks 58, the plate 59 and guide 60 are riveted or otherwise permanently secured together; accordingly, these elements are mounted to move with the supporting bars 45 along the side bars 30 and with the side bars 30 transversely of the machine, but they are also mounted to move vertically in a manner and for a purpose hereinafter to be described.

There are ten lower lugs 57 spaced uniformly along the machine on each supporting bar 45 and each of these lugs is slotted to receive the lower end of one of the selectors S, while the guide 60 is slotted to receive the upper ends of the selectors S. Each selector has a pin 61 projecting outwardly therefrom, so as to limit, by engagement with the guide 60, the downward movement of each selector. Each plate 59 is extended upwardly and bent inwardly so as to form a bar 62 or rather a sectional bar extending along the machine and bridging the selectors in order to form a pair of audit bars for a purpose hereinafter to be described.

*Selector actuating mechanism.*

Referring to Figures 3, 7, 8, 14, 15, 16 and 17, mounted in the heads 51 of each supporting bar 45 and in a hub 630 on each rear cross-head 31, is a shaft 63. Each shaft enters at its forward end the hollow rear end of a shank 52 and has an annular groove engaged by set screws 64 in the head so as to cause the shaft to move with its shank but permit rotation of the shaft in the shank. Splined on each shaft are a series of clutches 65, one for each selector, each clutch having an arm 66 which is perforated to engage a lug 67 on an outwardly turned lug on a selector. Mounted on each bar 45 adjacent each lower lug 57 is a bell-crank lever, one arm 68 of which has a pin engaging an annular groove in a clutch 65, while the other arm 69 has an inwardly directed pin 70. By movement of the bell-crank lever 68—69, the clutch 65 is moved into and out of clutch engagement with its selector, while in order to latch or retain this clutch in either engaged or disengaged position, the shaft 63 has a spring latch or retainer 71 adapted to engage either of two grooves on the clutch.

Each shaft 63 is at its rear end splined in the hub 630 having an arm 72 which is connected by a link 73 with a pin traveling in an arcuate slot 74 on the cross-head 31, the arc of the slot being symmetrical with respect to the pivotal connection between the arm and the link. Each link 73 has spaced lugs 75, the lower one of which is connected with a spring 76 anchored on the cross-head so as to normally tend to move the arms 72 down, Figure 15. The lugs 75 are in the path of and normally engage with a cross-bar 77 mounted between a pair of arms 78 on a rock shaft 79 supported in the side plates 2. One arm 78 has integral therewith a second arm 80 connected with a forwardly extending link 81 which is in turn pivoted to an arm 82 pivotally mounted at its lower end adjacent to the right side plate, Figures 15 and 17. A spring 83 anchored on the side plate connects with the arm 82 so as to normally tend to move the link 81 rearwardly in order to rock the shaft 79 and cause the engagement of the cross-bar 77 with the lug 75 to rock the shafts 63. The rocking of the shafts 63 will normally be an idle one; if, however, a pair of clutches 65 are in clutching engagement with a pair of selectors, then the rocking of these shafts will raise a pair of clutched selectors S. The arm 82 is normally latched so as to tension the spring 83 and maintain the parts in normal position, but in the manner and for a purpose hereinafter to be described. Accordingly, the spring 76 will maintain the shafts 63 in normal positions, the pins on the lugs 73 engaging the lower ends of the slots 74 to raise the shafts and maintain them in normal positions.

*Mechanism for rendering a pair of selectors effective for actuation.*

Referring to Figures 1, 2, 3, 5, 8 and 22, mounted on a bracket 90 and also on one or more brackets along the machine (not shown) is a channel-shaped support 91 which extends along the machine. This support has mounted thereon a series of ten rock shafts 92, which have fixed thereto arms 93 connected by cross bars 94 and each provided with a pair of outwardly directed spaced lugs 95 adapted to make a connection with the pin 70 on the arm 69 of the bell-crank lever 68—69. One arm 93 of each rock shaft has integral therewith an arm 96, the arms being bent inwardly to different extents, Figure 8, and each arm being connected with a spring 97 anchored on the support. Each arm is connected by a link 98 with a bell-crank lever 99, there being a series of ten such levers arranged in spaced relation and loosely mounted on a cross shaft 100 between the brackets 3. Each bell-crank lever 99 is connected by a link 101 with a bell-crank lever 102 which has a lateral lug engaged by a latch 103, there being a series of ten latches arranged in spaced relation, but loosely mounted on a cross shaft 104, between the side plates. Each latch is connected with a spring 105 anchored to a cross-bar 106 connecting the side plates so as to normally maintain the latch in engagement with its bell-crank lever 102 and normally maintain the bell-crank lever 93—96 in normal full line position, Figure 22, against the tension of the spring 97. Each latch 103 has an arm 107 provided with a laterally turned lug, there being a series of these arms or primary elements with the lugs thereon arranged in a line, but in spaced relation, transversely of the machine.

Upon depression of any selected arm 107, such as shown in Figure 22, the connected latch 103 will be released, thereby releasing the bell-crank lever 102 which will cause the spring 97 to operate the corresponding bell-crank lever 93—96 so as to move it to dotted position, Figure 22. This will cause the heads 95 by their engagement with the pins 70, Figure 8, on the bell-crank levers 68—69 to move the clutches 65 from full to dotted position, Figure 22, so as to clutch the shafts 63 with the corresponding selectors. A chosen pair of selectors is thus rendered effective for actuation.

*Mechanism for shifting the selector carrier longitudinally.*

Referring to Figures 2, 3, 6, 7, 9, 10, 17 and 23, the cross-bar 53 has lugs 120 engaged by a pair of latches 121 which are connected with bell-crank levers 122 carrying at their rear ends a cross-bar 123 in the path of a lug 124 on each of the carriers 125. A spring 119 anchored on the side plate 5 connects with one end of the levers 122 and operates to normally retain the latches 121 in engagement. There are ten carriers 125 but the lug 124 on the "0" carrier is omitted, as shown in Figure 3. Each carrier 125 has a transverse lug engaged by a latch 126 connected with a spring 127 anchored on a cross-bar 128 which is slotted to receive the carriers, while springs 1270 (Figure 3) connect the carriers 125 with the cross-bar 128 in order to move them downwardly when they are released. There are a series of ten of these latches, one for each carrier, mounted in spaced relation but loose on a cross-bar 129 connecting the side plates 5. Each latch has an arm 130 which is provided with a laterally turned lug, the lugs of the different arms or secondary elements being arranged in spaced relation in a line across the machine and immediately rearwardly of the lugs on the arms 107, Figure 22.

Upon depression of any selected arm 130, the corresponding latch 126 will release the corresponding carrier 125, thereby causing the lug 124 thereon to engage the cross-bar 123 and release the latch 121 so as to release the cross-bar 53 and with it the shanks 52 and supporting bars 45 and permit their springs 49 to move all of the selectors rearwardly on the side bars 30 of the carrier. Upon the depression of the "0" arm 130, the latches 121 are not released, for this is unnecessary for the "0" position as the selectors are normally in that position.

Each carrier 125, except as hereinafter noted, has a downward extension 131 upon which is slidingly mounted by a pin and slot connection, a stop 132. The stops 132 are of different lengths as shown more particularly in Figure 9, so as to form stop shoulders located at different positions longitudinally of the machine. A spring 133 is anchored at one end to the extension 131 of the carrier and is connected at its other end with the stop 132 so as to normally hold it in forward position but permit yielding movement of the stop to the right, Figure 23. It is not necessary to provide stops or even carrier extensions for the "0" and "9" positions, and accordingly, the stops and extensions on the "0" and "9" carriers are omitted.

Upon depression of the selector arm 130, the downward movement of the carrier from full to dotted positions, Figure 23, will position the stop 132 on the selected carrier in the path of the cross-bar 53 and in view of the fact that there is a lost motion between the lug 124 and the cross-bar 123, the stop will be positioned in the path of the cross-bar before the latches 121 release this cross-bar. Accordingly when the cross-bar is released and the selector carrier moved rearwardly under the action of its springs 49, this carrier will be arrested by the stop in the position corresponding thereto. Since, however, the springs 49 are stronger than the spring 133, the stop is carried to the right, Figure 23, until arrested as hereinafter described.

Arranged in the path of the stops 132 is a cross-bar 134 connecting a pair of arms 135 on a rock shaft 136 mounted in plates 5. Arranged between the arms 135 but in the path of the cross-bar 134 is a fixed stop 137 which is mounted on the cross-bar 4 between the plates 5. The rock shaft 136 has an arm 138, Figure 17, connected by a link 139 with a latch 140 on the side plate 2 and held by a spring 141 in engagement with a lug 142 on a link 143 connected with the arm 82.

When a selected carrier is released, thereby moving the corresponding stop 132 in the path of the cross-bar 53, this cross-bar after engaging the stop and carrying it forward will carry the yielding stop 134 with it until arrested by engagement with the fixed stop 137, it being understood that the carrier springs 49 are stronger than the combined tensions of the springs 133 and 141; accordingly, the latch 140 will be released from the lug 142.

As heretofore explained, the "9" carrier does not have a stop. Accordingly upon the depression of a "9" arm 130, the cross-bar 53 on the selector carrier engages directly with the yielding stop 134 carrying the same downward until arrested by the fixed stop 137 but also tripping the latch 140, thereby permitting maximum movement to be imparted to the selector carrier, as is required for the "9" position.

As heretofore explained, the "0" carrier does not have a stop nor even a tripping lug 124. In order, however, to trip the latch 140 for the "0" position, one of the arms 135 has a cam lug 144, Figures 2 and 23, which is engaged by a pin 145 on the "0" carrier. Accordingly, upon the actuation of the "0" arm 130, the release of the "0" carrier, while not releasing the selector carrier, will nevertheless trip the latch 140.

*Mechanism for shifting the selector carriage transversely.*

Referring to Figures 1, 2, 3, 6, 7, 8, 10, 17 and 24, connected with the links 40 to the cross head (not shown) is a link 160 which is connected with a cross-head 161 sliding in ways on the brackets 3 mounted on the base plate. This cross-head has a cross-bar 162 engaged by a pair of latches 163 loosely mounted on a shaft 164 in the brackets 3 and connected at their front ends by a yoke 165. A series of eight carriers 166 are loosely mounted on the shaft 164, and each carrier has an extension 167 engaged by a latch 168 retained by a spring 169 anchored to a cross-bar 170 between the brackets 3, while each extension is also engaged by a spring 171 also anchored on the cross-bar 170. Each latch 168 is connected with a link 172 passing through a slotted cross-bar 173 connecting the plates 5. This link has at its upper end a head 174 provided with a laterally turned lug, there being a series (ten) of these tertiary elements or heads and lugs arranged in spaced relation with the heads arranged in a line across the machine, but immediately rearwardly of the arms 130.

Upon the depression of any selected head 174, the corresponding latch 168 will be tripped so as to trip the corresponding extension on the corresponding carrier 166, thereby allowing this extension to be moved by its spring to dotted position, Figure 24, and causing it by its engagement with the yoke 165 to trip the latches 163 so as to release the cross-bar 162 and permit the carriage side bars 30 under the tension of their spring 41, Figure 14, to move outwardly until arrested as hereinafter described.

Each carrier has mounted thereon a stop 175 which, however, has a sliding movement to the right, Figure 24, being retained, however, in normal position by a spring 176 connecting this stop with the carrier. There are eight of these stops, as shown in Figure 10, corresponding to the several positions and having stop shoulders spaced along the machine. When a selected carrier is released, thereby moving its stop to dotted position, Figure 24, in the path of the cross-bar 162 connected with the selector carriage, it being understood that on account of the lost motion between the extension 167 and the yoke 165, the stop is positioned in the path of the cross-bar before the latter is released, the cross-bar will be stopped by a selected stop in the selected position. On account of the yielding connection between the stop and its carrier, however, the carriage spring 41 will overcome the spring 176 so that the cross-bar after engagement with the stop, will carry the stop with it on its carrier to the right, Figure 24.

A cross-bar 177 arranged in the path of the stops and cross-bar is mounted between a pair of arms 178 on a rock shaft 179 in the brackets 3. A fixed stop 180 mounted on the brackets 3 and between the arms 178 but in the path of the cross-bar 177 operates to arrest this cross-bar. The rock shaft 179 has an arm 181 connected by a link 182 with a latch 183 engaging the lug 142 on the link 143 and this latch is retained by a spring 184.

Upon depression of any selected head 174 causing the positioning of the corresponding stop in the path of the cross-bar 162, and causing release of this cross-bar, the cross-bar being carried rearwardly or to the right, Figure 24, will, after engagement with the stop 175 carry this stop with it, thereby moving the yielding stop 177 to the right, until arrested by the fixed stop 180. Accordingly, the carriage will be arrested in the selected position, while the second latch 183 will be tripped at this time.

As heretofore explained, there are only eight stops 175. The stop for the "5" position is unnecessary since that corresponds to the extreme outward positions of the carriage side bars. There is, however, provided for this "5" position, an extension 167, a latch 168, a link 172 and a head 174. Upon depression of the "5" key, the head 174 therefore, the cross-bar 162 will be released but will now be arrested in its extreme position by the yielding stop 177 engaged with the fixed stop 180 at the same time tripping the second latch 183.

As heretofore explained, there is no stop for the "0" position as there need not be for this position any release of the selector carriage, since the selector is normally in the "0" position. The link 172 is, however, in this case, connected with a bell crank lever 185, which is also loosely mounted upon the shaft 100 and is normally retained by a spring 169. This bell crank lever is connected by a link 186, Figures 3 and 7, through a lost motion connection with an arm 187 on the rock shaft 179. Accordingly, upon the depression of the "0" key, while the carriage is not released, the rock shaft 179 is rocked so as to through its connections, trip the second latch 183.

*The key and shifting mechanism.*

Referring to Figures 1, 2, 3, 6, 22, 23 and 24, 200 designates a series of plates connecting the side plates 5 and which are spaced to guide the shanks 201 of the keys which, in this case, are numbered from "1" to "0" inclusive, each key shank being recessed at 202 and being provided with a stop 203. Each key shank has a frame-like structure which is guided by the plates 200, whereby these key shank frames are maintained in alinement in a row across the machine. The lower end of each key shank has a laterally turned portion extending along the machine and each of these portions is arranged to cooperate with any position of one of a series of plungers 204 mounted in a carrier 205 which is, in turn, guided between the side plates 5 for movement along the machine. There are a series of ten of these plungers, one for each key shank, and one for each position of the elements 107, 130 and 174, and each plunger is normally held in raised position by a spring 206 bearing at its lower end against the carrier and at its upper end against a collar on the plunger. The carrier is provided at one end with teeth p, s and t adapted to be engaged by pawls 207 and 208, loosely mounted on a stub shaft 209 on a side plate 5 and connected by a spring 210. An arm 211 on the pawl 207 and an arm 212 on the pawl 208 straddle a pin 213 on an arm 214 engaged by a spring 215 anchored on the flange 7, and fixed to the rock shaft 216. An arm 217 integral with the arm 214 and still another arm fixed to the opposite end of but also attached to the rock shaft, are connected by a cross-bar 219 passing through the recess 202 in all of the keys and, therefore, engageable by any key.

The carrier 205 is engaged by arms 220,

Figures 1 and 17, mounted on the side plates 5 and connected with springs 221 anchored on these side plates. These springs will normally tend to move the carrier 205 to the right, Figure 22, but this carrier is retained in normal position with its set of plungers opposite the primary elements 107 by engagement of the pawl 207 with the first or primary tooth $p$. The above mechanism provides a transmitter intermediate the actuated elements of the different orders and the set of keys whereby the key depressions are transmitted to the elements, thereby enabling a single set of ten keys to be used.

Upon depression of any key, as the primary key (i. e., as the initial key in order to set up a number on the key board), the latter, will through the plunger and by its engagement with the primary element 107, trip the primary latch 103 so as to cause the mechanism to execute a primary operation (i. e., effect group location) as hereinafter described. During this movement of the selected key, however, the latter will by engagement with the cross-bar 219 and the rocking of the arm 214 raise the latch 207 to dotted position, Figure 22, thereby moving it out of engagement with the primary tooth $p$. Concurrently, however, and on account of the yielding connection of the pawl 207 with the pawl 208 thru the spring 210, the lower pawl 208 will be raised so as to move into the path of the primary tooth $p$. The lower pawl is, however, slightly shorter than the upper pawl so that the carrier will be slightly shifted to the right, Figure 22, until arrested by the lower pawl; this movement is not, however, sufficient to disengage the plunger 204 from the primary element 107. Upon release of the depressed key, the arm 214 will be returned by its spring 215, thereby engaging now with the lug 212 and moving the lower pawl 208 out of the path of the primary tooth $p$. The upper pawl will now first engage the top of the primary tooth but on account of the yielding connection 210, this is allowed for; as soon, however, as the lower pawl disengages from the primary tooth, the springs 221 will shift the carrier 205 to the right, Figure 22; but as the upper pawl is now in the path of the secondary tooth $s$, the carrier will be stopped by engagement of this secondary tooth with the upper pawl, thereby arresting the carrier in secondary position, as shown in Figure 23, and with the plungers 204 in alinement with the secondary elements 130 (i. e., the elements controlling the division location). Accordingly upon depression of any key as a secondary key, (i. e., the second key depressed to set up a number on the key board) the selected secondary element will be shifted so as to release the carrier 125 and cause the mechanism to execute the secondary operation (i. e., effect division location).

When the key is again released, the carrier 205 will again be shifted until it is arrested by the engagement of the tertiary tooth $t$ with the upper pawl, thereby positioning the plungers in tertiary position (to effect card location) and in alinement with the tertiary element 174, Figure 24. Accordingly upon depression of any key as a tertiary key, (i. e., the third key depressed to set up a number on the key board) the tertiary element 174 will be actuated to release the latch 168 and cause the mechanism to execute a tertiary operation (i. e., effect card location).

*Résumé of operation.*

Referring more particularly to Figures 22 to 26 inclusive, but also to Figures 2 and 3, a résumé of operations will be given, and for the purpose of illustration, we will assume that it is desired to obtain or locate and isolate card No. 122. This card is located in the second or "100" group in the third or "20" division of that group and it is the third or "2" card in that division or compartment. In proceeding to find this desired card, the auditor will successively depress keys "1", "2" and "2", depressing key "2" twice in succession; the operation will then be as follows:

*Primary operation.*

Upon the depression of the key "1" as the primary key, this key will through the corresponding plunger 204 depress the primary element 107, Figure 22, thereby causing the corresponding latch 103 to be tripped to release the bell crank lever 102, which through the link and lever connections 101, 99 and 98 will move the bell crank lever 93—96 corresponding to the second group and, therefore, the second pair of selectors, from full to dotted positions, Figure 22. This will accordingly shift the clutches 65 to dotted position from full line position, thereby clutching the shafts 63 with the second or "1" selectors so as to render these selectors effective for actuation. All of the other selectors will remain unclutched and disconnected from the shafts 63. Moreover, upon the release of the key, the carrier 205 will be shifted from full to dotted position, Figure 22, so as to position the plungers 204 in alinement with the secondary elements as shown in full lines, Figure 23.

*Secondary operation.*

Upon depression of the "2" key as a secondary key, Figure 23, the "2" plunger 204 will by engagement with the corresponding secondary element 130 trip the latch 126, which will in turn first position the "2" stop in the path of the cross-bar 53, connected with the selector carrier, and then trip the latches 121, thereby releasing the carrier. The selector carrier will now be moved rearwardly by its springs 49 so as to cause the cross-bar 53 to engage with the "2" stop 132, carrying the same forward against and moving the yielding stop 134, thereby tripping the first latch 140, Figure 17; the selector carrier will be thus moved from full to dotted position, Figure 23, until arrested by the fixed stop 137 through the medium of the yielding stop 134 and the stop 132. This will position all of the selectors to aline with the "2" compartment in each group. Moreover, since the bell crank levers 68—69 move with the selector carrier, they will disengage from the bell crank levers 93—96, but the clutches 65 for the "1" selectors will be retained by the latches 71. Concurrently the shift carrier 205 will have been shifted from full to dotted positions Figure 23, so as to now aline the plungers 204 with the tertiary elements as shown in full lines, Figure 24.

*Tertiary operation.*

Upon the depression of the "2" key as a tertiary key, Figure 24, this will operate through its corresponding plunger 204 to depress the tertiary element 174, thereby releasing the latch 168 and moving the "2" stop 175 into the path of the cross-bar 162 connected with the selector carriage, tripping the latches 163 to release the cross-bar 162 after the "2" stop is in position. The strong spring 41 will now expand the selector carriage moving the side bars 30 outwardly and carrying all of the selectors with it until the cross-bar 162 is arrested by the fixed stop through the yielding stops 177 and 175. This will move the selectors S from the position, Figure 25, to the position, Figure 26, so that these selectors are now positioned directly underneath the "2" characteristics on the "2" card in the tray. The shift carriage 205 will also be shifted another space at this time from full to dotted positions, Figure 24 so that the plungers 204 are now completely out of alinement with these keys, as well as the actuated elements, so that further depression of a key will have no effect. Accordingly, therefore, all of the selectors will be positioned underneath the "2" compartments and in cooperation with every "2" card in every such compartment and also underneath the plates 22 of the pilots for every such compartment.

*Isolation.*

It will be noted that during the secondary operation, the first latch 140 has been released; during the tertiary operation, the second latch 183 has also been released.

This release of the second latch 183, however, takes place at the end of the tertiary operation so that the lug 143 will not be free until the selectors are finally positioned transversely of the machine in their finally located positions. Upon complete release of the lug 142, Figure 17, the spring 83 will operate through the connections heretofore described and comprising the lever 82, link 81, the bell crank lever 80—78, Figures 15 and 16, the cross-bar 77, lugs 75, links 73 and arms 72 to rock the shafts 63 from full to dotted positions. Figure 8. In view of the fact, however, that all of the selectors except the "1" selectors for the second group are disconnected, the only pair of selectors which are effective for actuation will be the selectors of the second group, which are at this time positioned opposite the characteristics of the "2" card in the "20" division or compartment of the "100" group. Accordingly, these selectors will be raised from full to dotted positions, Figures 8, 24 and 26, thereby raising the card "122" and leaving all of the other cards undisturbed. Moreover, these selectors will engage the pilot in that compartment and raise it as shown. Accordingly, the desired card is isolated and the pilot for the compartment or division in which the card is located will also be raised to isolate that compartment.

*The restoring mechanism.*

Referring to Figures 1, 2, 3, 7, 8, 15, 16, 17 and 20, fixed to the shaft 230 mounted in the side plates 2 and the plates 5 is a crank arm or handle 231, and this shaft 230 has on each end a segment 232 meshing with a corresponding segment 233 on a countershaft 234 also mounted in the side plates 2. The countershaft 234 has a fixed arm 235 connected by a link 236 with a cam 237 mounted on the right side plate, Figure 1. This cam has an abrupt cam face 238 engaging a cam roll on a bell-crank lever 239 also mounted on the right side plate and connected with the link 143 which in turn is connected to the arm 82, and through the same to the link 81. It will be noted that beyond the rise 238, the cam is circumferential.

Upon movement of the handle 231 in the direction of the arrow, Figure 17, the counter shaft 234 will be rocked in the direction of the arrow, and this will through the arm, link, cam and bell-crank connections move the link 81 to the left, Figure 17, so as to swing the bell-crank lever 78—80 clockwise, Figure 16, and cause the cross-bar 77 by cooperation with the lower lugs 75 on the link 73 to rock the arms 72 opposite the directions of the arrows, Figure 15, and accordingly drop the selectors S from dotted to full positions, Figure 8, while, however, the carriage side bars and the selectors are still in outward dotted positions. Accordingly the selectors will be dropped, and as this is a quick movement on account of the abrupt cam face 238, it is the first movement imparted to the restoring mechanism on account of the lost motion provided to the other mechanisms, as hereinafter described. During the remaining part of the movement of the handle 231, the cam roll will ride on the circumferential surface of the cam 237. The shafts 63 will be retained in position with the selectors depressed and against the tension of the spring 83 by engagement of the latches 140 and 183 with the lug 142, Figure 17.

The rock shaft 234 has arms 240 which have lost-motion connections with links 241 connected to the cross-head 161. The rock shaft 234 further has fixed thereto an arm 242 connected with a link 243 having lost motion connected with an arm 244 fixed to the rock shaft 164 mounted in the brackets 3 and having fixed thereto arms 246 connected by a cross-bar 247 in the path of the downward extensions or lugs of the carriers 166.

Upon forward movement of the handle 231, the arms 240 will operate to return the cross-bar 161, thereby operating through the links 160 and links 40 to rock the shafts 37 so as to contract the carriage from dotted to full position, Figure 8, against the tension of the spring 41. Concurrently, the arm 242 will through the rock shaft 164 cause the cross-bar 247 to engage and move the previously operated carrier 166 and move the extension 167 thereon into engagement with its latch 168. This will release the latches 163 which on account of the yoke 165 acting as a weight tends to move these latches into engaging position. On account of the greater lost motion to the cross-head 161, the carrier 166 will be latched in position and the latches 163 will be ready to engage the cross-bar 162 when this cross-bar is at the limit of its forward movement. Accordingly this cross-bar will be latched so as to latch the selector carriage in contracted or "0" position, as shown in full lines, Figure 8.

The counter shaft 234 has fixed thereto arms 248 connected with links 249 which in turn have lost-motion connections with bell-crank levers 250 loosely mounted on the shaft 230. These bell-crank levers 250 have link connections 251 with the cross-head 53. The counter shaft 234 has fixed thereto an arm 252 which has a lost-motion connection with a link 253 connected with a bell-crank lever 254 on a rock shaft 255. Two arms 256 on the rock shaft 255 have a cross-bar 257 which engages slots in the secondary carriers 125.

Upon forward movement of the handle 231, the connections will operate to move the heads 54 and the connected cross-bar 53 forwardly while the cross-bar 257 moving upwardly will raise the previously operated carrier 125. Accordingly, the selector carrier will be returned to normal "0" position and latched by the engagement of the latches 121 with the cross-bar 53, while the secondary stop carrier 125 will be raised and returned to normal position and latched by its latch 126.

The counter shaft 234 has fixed thereto an arm 258 connected by a link 259 to an arm 260 on a rock shaft 261 which carries arms 262 connected by a cross-bar 263 which are in the path of the primary bell-crank levers 102.

Upon forward movement of the handle 231, it will operate through the connections described to move the cross-bar 263 to the right, Figures 3, 17 and 22, thereby operating to restore a shifted bell-crank lever 102, moving it into engagement with its latch 103. This will operate to return the shifted bell-crank lever 93—96 from dotted to full line position, Figure 22, and as the carrier has at this time been returned and as the pins 70 on the bell-crank levers 68—69 are at this time in cooperative relation with the lugs or heads 95, the clutches 65 will be returned from dotted to full position, Figure 22, so as to disengage the shafts 63 from the selectors and leave these selectors free.

The counter shaft 234 has arms 264 connected with links 265 which in turn have lost motion connections with the bell-crank lever 220 which, as heretofore described, are connected with the shift or transmitter carrier 205.

Upon forward movement of the handle 231, it will operate through the connections described to move the shift carrier 205 forwardly to its normal position with the plungers 204 in alinement with the primary elements 107 and with the pawl 207 in engagement with the primary tooth $p$.

This will have returned all of the parts to normal position, each part being latched under the tension of its spring, so that every part is in position for subsequent release when a new number is set up on the keyboard. The connections are so correlated that the mechanisms will not interfere, this being taken care of by the lost-motion connections provided to the several elements. After the handle 231 has been pulled forwardly, it is returned to normal position, but this will have no further effect upon the mechanism.

It will, therefore, be seen that in accordance with this invention any desired card may be found by the successive depression of keys corresponding to the number of that card. It will further be noted that the card is left in raised position and that the pilot is also left in raised position. Accordingly, the card can be readily replaced, as its division is indicated by the isolation of the division or compartment due to the raised position of the pilot. In view of the fact that the cards do not have to be placed in rotation in a division, the cards can be placed anywhere in the division or compartment, and in practice each card is replaced right in front of the pilot.

After the machine has been cleared and if it is desired again to replace a withdrawn card, it is only necessary to depress the number of the card on the key board, which while not raising the card, due to its absence, will raise the pilot of its compartment so that the card can be readily replaced. Accordingly, the finding and replacement of cards is facilitated.

The auditing mechanism.

It frequently becomes necessary to audit the system of accounts in order to determine whether a card has been misplaced or is missing. In accordance with this invention, there is provided an audit key which upon depression will render effective for operation auxiliary or audit selectors, which in combination with the other selectors, will automatically locate all of the pilots and all of the subdivisions of the cards in the tray. Upon depression of the selected key upon the main key board, the selectors are then positioned with respect to the characteristics so as to locate a card in each subdivision or compartment corresponding and ending in the number represented by the depressed key. Upon actuation of the selectors, the mechanism thereafter operates to isolate all of the pilots in the tray, and to isolate corresponding cards in each division or compartment which end in the same number as is represented by the depressed key.

Referring now to Figures 1, 2, 3, 4, 6, 7, 13 and 17, A designates an audit key, the shank 270 of which is guided in the cross-bar 173 and which is normally held in raised position by a spring 271. The shank has an extension or finger 272 which is adapted to engage a cross-bar 273 carried by arms on the shaft 104 and immediately above the primary elements 107. This extension is also in the path of a laterally turned lug 274 on the "0" secondary element 130. Accordingly upon depression of the audit key, all of the primary latches 103 and the "0" secondary latch 126 will be tripped, so as to release all of the primary bell-crank levers 93—96, and engage all of the clutches 65 with all of the selectors S, and so as to cause the "0" secondary carrier 125 to cause the release of the first latch 140, which retains through the connections described, actuation of the shafts 63.

The shaft 104 which is a rock shaft to which the cross-bar 273 is connected, has an arm 275 fixed thereto which is connected by a link 276 with an arm 277 on a rock shaft 278 mounted in the plates 5. This rock shaft has attached thereto arms 279 carrying a cross-bar 280 and normally held in full line position by a spring 281.

Mounted outside of the plates 59, Figure 13, are a pair of bars 282 which are mounted for sliding movement longitudinally of the machine, and are provided with lugs 283 adapted to take over pins 284 on the selectors S; these pins 284 in fact form extensions of the stop pins 61. As shown in Figures 2, 3, 13, the lugs 283 are arranged to take over the "0" selectors: however, there are additional lugs (not shown) along the bars 282 which are arranged to cooperate with pins on, for instance, the fourth and eighth selectors. A spring 285 connecting the bar 282 with the pin projecting from the plate 59 normally tends to hold the bar in position with the lug 283 free of the pin 284. Each bar has, however, a head 286 which is arranged to be engaged by the cross-bar 280 when the latter is moved to the right or from full to dotted position, Figure 2, so as to move the bars 282 with the lugs 283, thereon over the pins 284 on the selectors. Accordingly, some of the selectors will thus be locked to the plates 59 fixed to and forming a part of the selector carriers so that the audit bar sections 62 connected to the plates 59 will move with the selectors, it being noted that the audit bars bridge and form continuations of the selectors.

The arm 277 has a toe 287 in the path of a latch 288 pivoted on one of the plates 5 and provided with a lug 289 taking under the toe. The latch 288 is acted upon by a spring coiled around its pivot which normally tends to move it in a counter-clockwise direction. This latch is also in the path of the movement of a pin 257ª on bell-crank lever 254, which lever operates the cross-bar 257. The construction is such that when the arm 277 is operated by the audit key, to shift the audit connecting bars 282 from full to dotted position, Figure 2, the latch 288 will be moved to dotted position under the action of its spring to engage the toe 287 to latch parts in the dotted position.

The audit key shank 270 has a laterally projecting pin 290 engaging a cam face on a bar 291 hanging on an arm 292 loose on the rock shaft 216 and also pivoted to the upper pawl 207. The bar 291 has laterally turned lug 293, arranged upon depression to be placed in the path of a laterally turned lug 294 on the shift carrier 205. When the audit key is depressed the pin 290 acting on the cam bar 291 will shift the upper pawl 207 while the lower pawl is prevented from shifting due to the fact that the spring 215 is stronger than the spring 210; the lug 293 will, however, be placed in the path of the lug 294. Accordingly, the shift carrier 205 is released and it will move to the right, Figure 2, until arrested in dotted position by the engagement of the lugs 293 and 294 in the position corresponding to the second normal depression of a main key so that at this time the upper pawl 207 will be at its tip slightly to the left, Figure 2, of the tip of the second tooth *s*. Upon release of the audit key, therefore, causing the upper pawl 207 to move down, the shift carrier 205 will be arrested by the tertiary tooth *t* engaged with the upper pawl so as to position the plungers 204 opposite and in alinement with the tertiary elements 174. Accordingly, upon the depression of the audit key, the audit bars 62 will be interconnected with certain of the selector bars, all of these selector bars will be clutched to their actuating shafts 63, the first latch 140 will be tripped so that the selectors will be held against actuation by only the second latch 183, and the keys will be rendered effective for normal tertiary operation.

Upon depression of any desired key, for instance, the "2" key, this key will act through the plungers on the corresponding "2" tertiary element 174, release the selector carriage and cause it to be shifted but arrested in the "2" position, with all of the selectors and the audit bars opposite and underneath the characteristics on every card ending in "2".

After such positioning and on the release of the second latch 183, as heretofore described, the shafts 63 will be rocked to now raise all of the selectors, carrying the audit bars with them, so as to cause all of the pilots and all of the cards ending in "2" to be raised.

In practice, the spring 41 may not be strong enough to raise all of the selectors and all of the cards, and it may, therefore, be desirable to assist this spring by auxiliary means.

Referring to Figure 17, such mechanism is shown. The link 143 carries a lug 295 engaged by one arm of a lever 296 pivoted on the side plate 2, the other arm being connected by a link 297 with an arm 298 loosely mounted on the shaft 230 and provided with a finger piece 299. By pushing rearwardly on the finger piece, the link 143 is positively operated, thereby causing the positive raising of all of the selectors and audit bars.

It will be noted that the pilots are guided in such a manner that there is a sliding frictional engagement of each pilot with its support; accordingly when any pilot is raised it will remain elevated due to such frictional engagement. This requires that upon final clearing of the machine, mechanism be provided in order to positively depress the pilot or pilots, which has or have been elevated.

The pilot bars 22 project slightly beyond the vertical connecting bars 23, as shown in Figures 8 and 11, so as to form shoulders 300. Arranged inside of the plates 10 of the tray are bars 301 which are mounted on bell-crank levers 302, Figure 17, pivoted on the side 10 and connected with bars 303 which also extend along the tray. The bar 301 is supported on a series of these bell-crank levers 302 arranged along the tray and all of which are connected by bars 303. A spring 304 is connected at one end with each bar 303 and at its other end with the tray so as to normally tend to move the bars 303 to the left, Figure 2, in order to hold the bars 301 in raised position. The bars 303 each have a pin 305 in the path of an arm 306 on a stub shaft on the side plate 2, the stub shaft having fixed thereto a segment 307 meshing with a segment 308 pivoted on the plate 2 connected by a link 309 with an arm on the counter-shaft 234.

Upon forward movement of the handle 231, the arms 306 will be moved clockwise, Figure 17, thereby moving the bars 303 to the right, Figure 2, and causing the bars 301 to move downwardly and by their engagement with the shoulders 300 drop the pilots. Upon return of the arms, the spring 304 will restore the bars 301 to normal position.

In order to clear the machine after auditing, the handle 231 is pulled forwardly. The operation on all of the parts will be as before, except that the cross-bar 257 now cooperates with the latch 288 to disengage it from the toe 287, thereby causing the spring 281 to return the cross-bar 280 and causing the springs 285 to render the audit connecting bars 282 ineffective. This movement is, however, in the latter part of the movement of the handle and after the selectors and audit bars have been dropped. The mechanisms operate otherwise as heretofore described. The arm 298 is, of course, returned by the return movement of lug 295 on link 143 acting to return the lever 296 to original position when the link 143 is returned by bell-crank lever 239 and cam 237.

The audit mechanism can be used to quickly audit the accounts in a tray. Thus, for instance, if it is desired to audit an entire tray, it is only necessary to depress the audit key and then begin by depression of the "0" key. All of the cards ending in "0" will be isolated and the auditor can very readily determine if any card is missing or misplaced by its absence from one of the compartments and the presence of two cards in another. Similarly the other cards ending in "1", "2", "3", etc., may be readily audited, clearing the machine each time. In this way, it requires only ten operations to audit one thousand cards in a tray.

In order to find a misplaced card, it is only necessary to set the audit key and then depress a key ending in the number of the misplaced card; since this raises all cards ending in that number the misplaced card can readily be found, due to the fact that there will be two cards ending in that number in one compartment, one of which is misplaced. Of course, the fact that a card is lost can be determined in the same way.

The unpacking mechanism.

In view of the fact that the cards are closely packed in order to economize space, it is desirable that some means be provided for unpacking a selected unit or compartment so as to permit a selected card to be readily removed or replaced. Means are, therefore, provided to permit expansion of a compartment.

Referring to Figures 2, 8, and 17, 310 designates a pair of bars which are mounted for sliding movement along and inside on the side plates 10, forming the tray casing, by headed pins 311 on the casing engaging slots 312 in the bars. The bars are bent over to provide downwardly projecting toothed flanges 313 spaced from the bars and providing flared recesses opposite the respective bars 23 connected with the pilots. The bars may be provided with thumb pieces 314 whereby they may be moved longitudinally of the machine.

Upon location of a selected card and isolation of the same together with its pilot, the pilots will upon being raised, as shown in Figure 8, move between a pair of lugs 313 in alinement therewith so as to now become interlocked with the side bars 310. By then pushing the bars rearwardly, the partition 16 is moved back, which movement is permitted on account of the flexibility, thereby expanding the compartment and permitting removal or replacement of a card.

Multiple tray construction.

In accordance with this invention, means is provided whereby single selecting mechanism is connected with a series of trays. Referring to Figures 19 to 21 inclusive, 320 designates a pair of bars of a frame supported in any suitable manner as on legs 321. This frame is arranged to support a series of trays 10—11, each of which can be arranged to contain one thousand cards. Cross pieces 322 are arranged between the trays, while tracks 323 mounted on bars 320 extend along the frame.

The selecting mechanism is carried by a cradle comprising brackets 324 connected by a casing 334 and strengthened by diagonal braces 338, so as to form a casing into which the selecting mechanism may be inserted. The stirrups 327 are provided with locating means including locating screws 328 at each end of the cradle entering corresponding sockets in the base 1 so as to accurately position the mechanism in the cradle. The cradle is suspended from the tracks by rollers 326 on stub shafts in brackets 324. The brackets 324 support centrally a shaft 239 having at its ends and fixed thereto gears 330 cooperating with racks 331 on the lower faces of the tracks 323 so as to keep the mechanism in alinement.

A locking bolt 332 is carried by a bell-crank lever 333 inside of the stirrups 327 and on the casing 334, and this bell-crank lever is connected by a link 335 with a handle 336 on the cradle. The bolt is actuated by a spring 337 connecting the link 335 with the casing 334, and this bolt 332 is arranged to engage sockets in the cross pieces 322. In practice there is a bolt 332 arranged at the rear as well as at the forward end of the cradle, and the bell-crank 333 of this second bolt is connected with the rear end of the link 335.

The mechanism can be shifted under any desired tray by moving the handle 336 down, thereby withdrawing the bolts 332 from their sockets, and the mechanism can then be moved into cooperative relation with any tray. When the mechanism is in alinement with the desired tray, it is located in alinement by engagement of the bolts with the keepers or sockets. The mechanism will then be in proper position with the selectors properly alined so as to cooperate with the different compartments and with the selective characteristics on the cards in those compartments.

It is obvious that various changes may be made in the details of construction without departing from the spirit of this invention; it is, therefore, to be understood that this invention is not to be limited to the specific details shown and described.

Having thus described the invention, what is claimed is:

1. An accounting apparatus, comprising, a tray having cards therein, a selector adapted to engage the cards, means for locating said selector with respect to a unit of cards, and means for locating said selector with respect to a card of the located unit.

2. An accounting apparatus, comprising, a tray having cards therein, a selector adapted to engage the cards, means for locating said selector with respect to a unit of cards, means for locating said selector with respect to a card of the located unit, and means for causing said selector to engage and isolate the located card.

3. An accounting apparatus, comprising, a tray having cards therein, a selector adapted to engage the cards, means for locating said selector with respect to a group of cards, means for locating said selector with respect to a division of the located group, and means for locating said selector with respect to a card of the located division.

4. An accounting apparatus, comprising, a tray having cards therein, a selector adapted to engage the cards, means for locating said selector with respect to a group of cards, means for locating said selector with respect to a division of the located group, means for locating said selector with respect to a card of the located division, and means for causing said selector to engage and isolate the located card.

5. An accounting apparatus, comprising, a tray having cards therein provided with selective characteristics, a selector adapted to engage the characteristics, means for locating said selector with respect to a unit of cards, and means for locating said selector with respect to a characteristic of a card of the located unit.

6. An accounting apparatus, comprising, a tray having cards therein provided with selective characteristics, a selector adapted to engage the characteristics, means for locating said selector with respect to a unit of cards, means for locating said selector with respect to a characteristic of a card of the located unit, and means for causing said selector to engage the characteristic and isolate the located card.

7. An accounting apparatus, comprising, a tray having cards therein provided with selective characteristics, a selector adapted to engage the characteristics, means for locating said selector with respect to a group of cards, means for locating said selector with respect to a division of the located group, and means for locating said selector with respect to a characteristic of a card of the located division.

8. An accounting apparatus, comprising, a tray having cards therein provided with selective characteristics, a selector adapted to engage the characteristics, means for locating said selector with respect to a group of cards, means for locating said selector with respect to a division of the located group, means for locating said selector with respect to a characteristic of a card of the located division, and means for causing said selector to engage the characteristic and isolate the located card.

9. An accounting apparatus, comprising, a tray having cards therein, a selector adapted to engage the cards, means for locating said selector with respect to a unit of cards, means for locating said selector with respect to a card of the located unit, and means for guiding said selector into engagement with the located card.

10. In an accounting apparatus, comprising, a tray having cards therein, a selector adapted to engage the cards, means for locating said selector with respect to a unit of cards, means for locating said selector with respect to a card of the located unit, and means for causing said selector to engage and isolate the located card, including a guide adapted to insure such engagement.

11. An accounting apparatus, comprising, a tray having cards therein, a selector adapted to engage the cards, means for locating said selector with respect to a group of cards, means for locating said selector with respect to a division of the located group, means for locating said selector with respect to a card of the located division, and means for guiding said selector into engagement with the located card.

12. An accounting apparatus, comprising, a tray having cards therein, a selector adapted to engage the cards, means for locating said selector with respect to a group of cards, means for locating said selector with respect to a division of the located group, means for locating said selector with respect to a card of the located division, and means for causing said selector to engage and isolate the located card, including a guide adapted to insure such engagement.

13. An accounting apparatus, comprising, a tray having cards therein provided with selective characteristics, a selector adapted to engage the characteristics, means for locating said selector with respect to a unit of cards, means for locating said selector with respect to a characteristic of a card of the located unit, and means for guiding said selector into engagement with the characteristic of the located card.

14. An accounting apparatus, comprising, a tray having cards therein provided with selective characteristics, a selector adapted to engage the characteristics, means for locating said selector with respect to a unit of cards, means for locating said selector with respect to a characteristic of a card of the located unit, and means for causing said selector to engage the characteristic and isolate the located card, including a guide adapted to insure such engagement.

15. An accounting apparatus, comprising, a tray having cards therein, a selector means for supporting said selector for movement relatively to said tray, means for moving said selector to engage the cards, and means cooperating with the card-engaging part of said selector adapted to insure such engagement.

16. An accounting apparatus, comprising, a tray having cards therein, a selector, means for supporting said selector for movement relatively to said tray, means for moving said selector to engage the cards, and means cooperating with the card-engaging part of said selector adapted to guide said selector into engagement.

17. An accounting apparatus, comprising, a tray having cards therein, a selector adapted to engage the cards, means for supporting said selector for movement relatively to said tray, means for locating said selector with respect to a predetermined portion of the cards in said tray, and means cooperating with the card-engaging part of said selector adapted to insure such engagement.

18. An accounting apparatus, comprising, a tray having cards therein, a selector adapted to engage the cards, means for supporting said selector for movement relatively to said tray, means for locating said selector with respect to a predetermined portion of the cards in said tray, and selector-guiding means on said tray cooperating with the card-engaging part of said selector.

19. An accounting apparatus, comprising, a tray having cards therein, a selector adapted to engage the cards, means for supporting said selector for movement relatively to said tray, means for locating said selector in variant positions with respect to said tray, and a series of means cooperating with the card-engaging part of said selector adapted to insure such engagement in such variant positions.

20. An accounting apparatus, comprising, a tray having cards therein, a selector adapted to engage the cards, means for locating said selector in variant positions with respect to said tray, and a series of selector-guiding means on said tray corresponding to such variant positions and cooperating with the card-engaging part of said selector.

21. An accounting apparatus, comprising, a tray having cards therein, a selector adapted to engage the cards, means for adjusting said selector to variant positions along said tray, and a series of means adapted to insure such engagement of said selector in its variant positions.

22. An accounting apparatus, comprising, a support, a tray thereon having cards therein, a selector adapted to engage the cards, means for adjusting said selector to variant positions along said tray, and a series of selector guides on said tray corresponding to such variant positions.

23. An accounting apparatus, comprising, a tray having cards therein, a selector adapted to engage the cards, means for adjusting said selector to variant positions transversely of said tray, and a series of means cooperating with the card-engaging part of said selector adapted to insure such engagement of said selector in its variant positions.

24. An accounting apparatus, comprising, a tray having cards therein, a selector adapted to engage the cards, means for adjusting said selector to variant positions transversely of said tray, and a series of selector guides on said tray corresponding to such variant positions and cooperating with the card-engaging part of said selector.

25. An accounting apparatus, comprising, a tray having cards therein, a selector adapted to engage the cards, means for adjusting said selector to variant positions along and transversely of said tray, and means adapted to insure such engagement of said selector in its variant positions.

26. An accounting apparatus, comprising, a tray having cards therein, a selector adapted to engage the cards, means for adjusting said selector to variant positions along and transversely of said tray, and selector guides on said tray corresponding to such variant positions.

27. An accounting apparatus, comprising, a tray having cards therein provided with selective characteristics, a selector, means for supporting said selector for movement relatively to said tray, means for moving said selector to engage said characteristics, and means cooperating with the card-engaging part of said selector adapted to insure such engagement.

28. An accounting apparatus, comprising, a tray having cards therein provided with selective characteristics, a selector adapted to engage said characteristics, means for supporting said selector for movement relatively to said tray, means for adjusting said selector to variant positions to cooperate with selected characteristics, and means cooperating with the card-engaging part of said selector adapted to insure selector engagement with a selected characteristic.

29. An accounting apparatus, comprising, a tray having cards therein provided with selective characteristics, a selector adapted to engage said characteristics, means for supporting said selector for movement relatively to said tray, means for adjusting said selector to variant positions to cooperate with selected characteristics, and a series of selector guides on said tray corresponding to the respective positions of said characteristics and cooperating with the card-engaging part of said selector.

30. An accounting apparatus, comprising, a tray having cards therein, each card having selector-coactable characteristics along its edge, and selector guides on said tray and adjacent those edges of the cards having said characteristics.

31. An accounting apparatus, comprising, a tray having cards therein, each card having selector-coactable characteristics along its edge, and selector guides on said tray adapted to overlap said edges of the cards.

32. An accounting apparatus, comprising, a tray having cards arranged in units therein, and selector guides on said tray and corresponding to the respective cards of a unit.

33. An accounting apparatus, comprising, a support, a tray thereon having partitions, and selector guides on said partitions.

34. An accounting apparatus, comprising, a support, a tray thereon having a series of transverse guide supports, and selector guides on said supports.

35. An accounting apparatus, comprising, a support, a tray thereon having a series of transverse partitions, and selector guides on said partitions.

36. An accounting apparatus, comprising, a tray, a selector, means for supporting said selector for movement relatively to said tray, said tray having cards therein provided with selective characteristics which are adapted and positioned for butt engagement by said selector, and selector guides on said tray and adapted to overlap said characteristics.

37. An accounting apparatus, comprising, a tray having cards arranged in units therein, corresponding cards of the units having corresponding characteristics, and selector guides on said tray and corresponding to said characteristics.

38. An accounting apparatus, comprising, a tray having cards arranged in units therein, corresponding cards of the units having corresponding characteristics, guide supports on said tray corresponding to said units, and selector guides on said supports corresponding to said characteristics.

39. An accounting apparatus, comprising, a tray having cards arranged in units therein, corresponding cards of the units having corresponding characteristics, transverse guide strips mounted on said tray and corresponding to said units, and selector guides along said strips corresponding to said characteristics.

40. An accounting apparatus, comprising, a card tray having transverse selector guide members in the bottom thereof.

41. An accounting apparatus, comprising, a card tray having transverse strips in the bottom thereof, said strips being notched to form selector guides.

42. An accounting apparatus, comprising, a card tray having transverse strips in the bottom thereof, said strips being notched to form pairs of selector guides.

43. An accounting apparatus, comprising, a card tray having transverse strips in the bottom thereof, said strips being notched to form pairs of selector guides arranged symmetrically on opposite sides of the median line of the tray.

44. An accounting apparatus, comprising, a card tray having transverse selector guide members in the bottom thereof, and transverse partitions corresponding to said guides.

45. An accounting apparatus, comprising, a card tray having transverse strips in the bottom thereof, said strips being notched to form selector guides on opposite sides of the median line of the tray.

46. An accounting apparatus, comprising, a card tray having transverse strips in the bottom thereof, said strips being notched to form selector guides on opposite sides of the median line of the tray, and a tie connecting said guides along the median line.

47. An accounting apparatus, comprising, a tray, pilots therein, a selector adapted to engage said pilots, and means for locating said selector with respect to a pilot.

48. An accounting apparatus, comprising, a tray, pilots therein, a selector adapted to engage said pilots, means for locating said selector with respect to a pilot, and means for causing said selector to engage and isolate the located pilot.

49. An accounting apparatus, comprising, a tray, pilots therein, a selector adapted to engage said pilots, means for locating said selector with respect to a pilot, means for causing said selector to engage and isolate the located pilot, and means for positively returning the isolated pilot.

50. An accounting apparatus, comprising, a tray, pilots therein, and a selector engageable element on each pilot and extending across said tray.

51. An accounting apparatus, comprising, a tray, having transverse partitions, a pilot for each partition, and a transverse selector engageable element on each pilot.

52. In an apparatus of the class described, a selector carrier, a selector mounted thereon, an actuator mounted on said carrier and adapted to actuate said selector, and means for positioning said carrier and for automatically effecting operation of said actuator when positioned.

53. In an apparatus of the class described, a selector carrier, a selector mounted thereon, an actuator mounted on said carrier, and means for connecting and disconnecting said actuator with and from said selector.

54. In an apparatus of the class described, a selector carrier, a selector mounted thereon, an actuator, and a clutch for connecting said actuator with said selector.

55. In an apparatus of the class described, a selector carrier, a selector mounted thereon, an actuator mounted on said carrier, and a clutch on said actuator adapted to engage said selector.

56. In an apparatus of the class described, a selector carrier, a selector mounted thereon, an actuator, a clutch for connecting said actuator with said selector, and a retainer for said clutch.

57. In an apparatus of the class described, a carriage, a carrier mounted thereon, a selector mounted on said carrier, and an actuator for said selector and mounted on said carrier.

58. In an apparatus of the class described, a carriage, a carrier mounted thereon, a selector mounted on said carrier, an actuator for said selector and mounted on said carrier, and means for positioning said carrier.

59. In an apparatus of the class described, a carriage, a carrier mounted thereon, a selector mounted on said carrier, an actuator for said selector and mounted on said carriage, and means for positioning said carriage.

60. In an apparatus of the class described, a carriage, a carrier mounted thereon, a selector mounted on said carrier, an actuator for said selector and mounted on said carrier, means for positioning said carriage, and means for positioning said carrier.

61. In an apparatus of the class described, a card selector, an actuator, a clutch for connecting said actuator with said selector, and a retainer for said clutch.

62. In an apparatus of the class described, a card selector, an actuator, a clutch for connecting said actuator with said selector, and disconnectible means for engaging said clutch.

63. In an apparatus of the class described, a card selector, an actuator, a clutch for connecting said actuator with said selector, disconnectible means for engaging said clutch, and a retainer for said clutch.

64. In an apparatus of the class described, a selector, a rock shaft, and a clutch for connecting said rock shaft with said selector.

65. In an apparatus of the class described, a selector, a rock shaft, a clutch for connecting said rock shaft with said selector, and a retainer for said clutch.

66. In an apparatus of the class described, a selector, a rock shaft, a clutch for connecting said rock shaft with said selector, and disconnectible means for engaging said clutch.

67. In an apparatus of the class described, a selector, a rock shaft, a clutch for connecting said rock shaft with said selector, disconnectible means for engaging said clutch, and a retainer for said clutch.

68. In an apparatus of the class described, a carrier, a selector mounted thereon, an actuator mounted on said carrier, a clutch for connecting said actuator with said selector, and disconnectible means for engaging said clutch.

69. In an apparatus of the class described, a carrier, a selector mounted thereon, an actuator mounted on said carrier, a clutch for connecting said actuator with said selector, disconnectible means for engaging said clutch, and a retainer for said clutch.

70. In an apparatus of the class described, a carriage, a carrier thereon, a selector on said carrier, an actuator on said carrier, and a clutch for connecting said actuator with said selector.

71. In an apparatus of the class described, a carriage, a carrier thereon, a selector on said carrier, an actuator on said carrier, a clutch for connecting said actuator with said selector, and a retainer for said clutch.

72. In an apparatus of the class described, a carriage, a carrier thereon, a selector on said carrier, an actuator on said carrier, a clutch for connecting said actuator with said selector, and disconnectible means for engaging said clutch.

73. In an apparatus of the class described, a carriage, a carrier thereon, a selector on said carrier, an actuator on said carrier, a clutch for connecting said actuator with said selector, disconnectible means for engaging said clutch, and a retainer for said clutch.

74. In an apparatus of the class described, a series of selectors, an actuator, and clutches for selectively connecting said actuator with said selectors.

75. In an apparatus of the class described, a series of selectors, an actuator, clutches for selectively connecting said actuator with said selectors, and retainers for said clutches.

76. In an apparatus of the class described, a series of selectors, an actuator, clutches for connecting said actuator with said selectors, and disconnectible means for selectively engaging said clutches.

77. In an apparatus of the class described, a series of selectors, an actuator, clutches for connecting said actuator with said selectors, disconnectible means for selectively engaging said clutches, and retainers for said clutches.

78. In an apparatus of the class described, a carrier, a series of selectors thereon, an actuator mounted on said carrier, and means for selectively connecting said actuator with said selectors.

79. In an apparatus of the class described, a carrier, a series of selectors thereon, an actuator mounted on said carrier, means for positioning said carrier, and means for selectively connecting said actuator with said selectors.

80. In an apparatus of the class described, a carrier, a series of selectors thereon, an actuator mounted on said carrier, means for selectively connecting said actuator with said selectors, and means for causing said actuator to become disconnected.

81. In an apparatus of the class described, a carriage, a carrier thereon, a series of selectors on said carrier, an actuator mounted on said carrier, and means for selectively connecting said actuator with said selectors.

82. In an apparatus of the class described, a carriage, a carrier thereon, a series of selectors on said carrier, an actuator mounted on said carrier, means for selectively connecting said actuator with said selectors, and means for causing said actuator to become disconnected.

83. In an apparatus of the class described, a series of selectors, an actuator, clutches for connecting said actuator with said selectors, and engaging elements for said clutches, 84. In an apparatus of the class described, a series of selectors, an actuator, clutches for connecting said actuator with said selectors, and disconnectible engaging elements for said clutches.

85. In an apparatus of the class described, a series of selectors, an actuator, clutches for connecting said actuator with said selectors, engaging elements for said clutches, and means for selectively operating said elements.

86. In an apparatus of the class described, a series of selectors, an actuator, clutches for connecting said actuator with said selectors, disconnectible engaging elements for said clutches, and means for selectively operating said elements.

87. In an apparatus of the class described, a carrier, a series of selectors thereon, an actuator mounted on said carrier, clutches for connecting said actuator with said selectors, and disconnectible engaging elements for said clutches.

88. In an apparatus of the class described, a carrier, a series of selectors thereon, an actuator mounted on said carrier, clutches for connecting said actuator with said selectors, disconnectible engaging elements for said clutches, and means for selectively operating said elements.

89. In an apparatus of the class described, a series of selectors, an actuator, clutches for connecting said actuator with said selectors, and means for concurrently engaging a plurality of said clutches.

90. In an apparatus of the class described, a carriage, a series of selectors thereon, an actuator mounted on said carriage, clutches for connecting said actuator with said selectors, and means for concurrently engaging a plurality of said clutches.

91. In an apparatus of the class described, a carriage, a carrier thereon, a series of selectors mounted on said carrier, an actuator mounted on said carrier, clutches for connecting said actuator with said selectors, and means for concurrently engaging a plurality of said clutches.

92. In an apparatus of the class described, a series of selectors, an actuator, clutches for connecting said actuator with said selectors, means for concurrently engaging a plurality of said clutches, and retainers for said clutches.

93. In an apparatus of the class described, a carriage, a series of selectors thereon, an actuator mounted on said carriage, clutches for connecting said actuator with said selectors, and disconnectible means for concurrently engaging said clutches.

94. In an apparatus of the class described, a carriage, a series of selectors thereon, an actuator mounted on said carriage, clutches for connecting said actuator with said selectors, disconnectible means for concurrently engaging said clutches, and retainers for said clutches.

95. In an apparatus of the class described, a series of main selectors, a series of audit selectors, means for operating said main selectors, and means for connecting a plurality of said main selectors to said audit selectors for concurrent operation.

96. In an apparatus of the class described, a series of main selectors, a series of audit selectors, means for operating said main selectors, means for connecting a plurality of said main selectors to said audit selectors for concurrent operation, and means for concurrently actuating said connected main and audit selectors.

97. In an apparatus of the class described, a series of main selectors, a series of audit selectors, an actuator, clutches for connecting said actuator with said main selectors, means for concurrently engaging a plurality of said clutches so that said actuator concurrently operates a plurality of main selectors, and means for connecting main selectors corresponding to the engaged clutches to audit selectors for concurrent actuation of said main and audit selectors by said actuator.

98. In an apparatus of the class described, a series of main selectors, a series of audit selectors bridging said main selectors, means for operating said main selectors, means for connecting a plurality of said main and audit selectors, an actuator, and means for connecting said actuator with said connected main and audit selectors for concurrent operation.

99. In an apparatus of the class described, a series of main selectors, a series of audit selectors bridging said main selectors, a connecting element, and means for shifting said element adapted to connect a plurality of said main and audit selectors.

100. In an apparatus of the class described, a series of main selectors, a series of audit selectors, means for operating said main selectors, a connecting element, means for shifting said element adapted to connect a plurality of said main selectors and audit selectors, and means for operating said connected main and audit selectors by actuation of a plurality of said main selectors.

101. In an apparatus of the class described, a series of spaced main selectors, and audit selectors arranged intermediate said main selectors.

102. In an apparatus of the class described, a series of spaced main selectors, and audit selectors arranged intermediate and bridging said main selectors.

103. In an apparatus of the class described, a carriage, a series of spaced main selectors mounted on said carriage, and a series of audit selectors mounted on said carriage and arranged intermediate said main selectors.

104. In an apparatus of the class described, a series of spaced main selectors, audit selectors arranged intermediate said main selectors, and means for selectively actuating said main selectors.

105. In an apparatus of the class described, a series of spaced main selectors, audit selectors arranged intermediate said main selectors, and means for interconnecting a plurality of said main selectors with said audit selectors.

106. In an apparatus of the class described, a series of spaced main selectors, and audit selectors arranged intermediate said main selectors and adapted to form therewith a continuous selector.

107. In an apparatus of the class described, a series of spaced main selectors, audit selectors arranged intermediate said main selectors, and means for connecting said audit selectors for operation by a plurality of said main selectors.

108. In an apparatus of the class described, a series of spaced main selectors, audit selectors arranged intermediate said main selectors, and means for connecting said audit selectors with a plurality of said main selectors for operation thereby and therewith.

109. In an apparatus of the class described, a series of spaced main selectors, audit selectors arranged intermediate said main selectors, and means adapted to interconnect a plurality of said main selectors and said audit selectors.

110. In an apparatus of the class described. a series of spaced main selectors, and a bar extending along said selectors and having selector parts bridging said selectors.

111. In an apparatus of the class described, a series of spaced main selectors, and a bar extending along said selectors and having selector parts bridging said selectors and in the plane thereof.

112. In an apparatus of the class described, a series of spaced main selectors, a bar extending along said selectors and having selector parts bridging said selectors, and means for connecting said bar with a plurality of said selectors.

113. In a machine of the class described, an audit selector, means for rendering said selector effective for actuation, and means for positively actuating said selector.

114. In a machine of the class described. an audit selector. and means for positively actuating audit selector.

115. In a machine of the class described, a series of main selectors, an audit selector, and means for positively actuating said main and audit selectors.

116. In a machine of the class described, a series of main selectors, an audit selector, spring means for actuating said main selectors, and means for positively actuating said audit selector.

117. In a machine of the class described, a series of main selectors, an audit selector, spring means for actuating said main selectors, and means for positively actuating said audit selector and said main selectors in unison.

118. In an apparatus of the class described, a selector carrier, a selector thereon, stops adapted to variantly position said carrier, and slidable carrying elements for said stops.

119. In an apparatus of the class described, a selector carrier, a selector thereon, stops adapted to variantly position said carrier, slidable carrying elements for said stops, and selective manipulative elements adapted to release said carrier elements.

120. In an apparatus of the class described, a selector carrier, a selector thereon, a retainer for said carrier, stops adapted to variantly position said carrier, and slidable carrying elements for said stops and adapted to release said retainer.

121. In an apparatus of the class described, a series of selectors, means for effecting location of said selectors including primary, secondary and tertiary elements, and means for concurrently actuating all of said primary elements.

122. In an apparatus of the class described, a series of selectors, means for effecting location of said selectors including primary, secondary and tertiary elements, and means for concurrently actuating all of said primary elements, and adapted to eliminate actuation of said secondary elements.

123. In an apparatus of the class described, a series of selectors, means for effecting location of said selectors including primary, secondary and tertiary elements, means for concurrently actuating all of said primary elements, and adapted to eliminate actuation of said secondary elements, and means for actuating a selected tertiary element.

124. In an apparatus of the class described, a series of selectors, means for effecting location of said selectors including primary, secondary and tertiary elements, an actuator for said selectors, and means for concurrently actuating all of said primary elements adapted also to render effective for actuation said selectors.

125. In an apparatus of the class described, a series of selectors, means for effecting location of said selectors including primary, secondary and teritary elements, an actuator for said selectors, and means for concurrently actuating all of said primary elements adapted also to render effective for actuation said selectors and to eliminate actuation of said secondary elements.

126. In an apparatus of the class described, a series of selectors, means for effecting location of said selectors including primary, secondary and tertiary elements, an actuator for said selectors, and means for concurrently actuating all of said primary elements adapted also to render effective for actuation said selectors and to eliminate actuation of said secondary elements, and means for actuating a selected tertiary element adapted to actuate said selectors.

127. In an apparatus of the class described, a series of spaced main selectors, a series of audit selectors intermediate and bridging said main selectors, means for effecting location of said main selectors, and means for interconnecting a plurality of said main selectors and said audit selectors for concurrent operation.

128. In an apparatus of the class described, a series of spaced main selectors, a series of audit selectors intermediate and bridging said main selectors, means for effecting primary, secondary and tertiary locations of said main selectors and means for interconnecting a plurality of said main selectors and said audit selectors for concurrent operation.

129. In an apparatus of the class described, a series of spaced main selectors, a series of audit selectors intermediate and bridging said main selectors, actuating means for effecting primary, secondary and tertiary locations of said main selectors, means for interconnecting a plurality of said main selectors and said audit selectors for concurrent operation and primary location by said actuating means, and means functioning upon such interconnection to eliminate the secondary location.

130. In an apparatus of the class described, a series of spaced main selectors, a series of audit selectors intermediate and bridging said main selectors, actuating means for effecting primary, secondary and tertiary locations of said main selectors, means for interconnecting a plurality of said main selectors and said audit selectors for concurrent operation and primary location by said actuating means, and means functioning upon such interconnection and actuation to effect the primary location but eliminate the secondary location.

131. In an apparatus of the class described, a series of spaced main selectors, a series of audit selectors intermediate and bridging said main selectors, actuating means for effecting primary, secondary and tertiary locations of said main selectors, means for interconnecting a plurality of said main selectors and audit selectors for concurrent operation and primary location by said actuating means, said means functioning upon such interconnection to eliminate the secondary location, and means for effecting tertiary location of the interconnected selectors.

132. In an apparatus of the class described, a series of spaced main selectors, a series of audit selectors intermediate and bridging said main selectors, actuating means for effecting primary, secondary and tertiary locations of said main selectors, means for interconnecting a plurality of said main selectors and audit selectors for concurrent operation and primary location by said actuating means, means functioning upon such interconnection and actuation to eliminate the secondary location, and means for effecting tertiary location of the interconnected selectors.

133. In an apparatus of the class described, a frame, a series of card trays thereon, selecting mechanism adapted to cooperate with the cards in any of said trays, and a cradle for said mechanism mounted to travel along said frame.

134. In an apparatus of the class described, a frame, a series of card trays thereon, selecting mechanism adapted to cooperate with the cards in any of said trays, a cradle for said mechanism mounted to travel along said frame, and means for locating said mechanism in said cradle.

135. In an apparatus of the class described, a frame, a series of card trays thereon, selecting mechanism adapted to cooperate with the cards in any of said trays, and a cradle mounted to travel along said frame and adapted to removably support said mechanism.

136. In an apparatus of the class described, a frame, a series of card trays thereon, selecting mechanism adapted to cooperate with the cards in any of said trays, a cradle mounted to travel along said frame and adapted to removably support said mechanism, and means for locating said mechanism in said cradle.

137. In an apparatus of the class described, a frame, a series of card trays thereon, selecting mechanism adapted to cooperate with the cards in any of said trays, a cradle for said mechanism mounted to travel along said frame, and means for maintaining said cradle in alinement during its travel.

138. In an apparatus of the class described, a frame, a series of card trays thereon, selecting mechanism adapted to cooperate with the cards in any of said trays, a cradle for said mechanism mounted to travel along said frame, and means for locating said cradle with the mechanism thereon in cooperative relation with said trays.

139. In an accounting apparatus having selecting means, a unit of account cards and a pilot for said unit, said cards having variant pairs of selector-engaging portions adapted for engagement by a corresponding pair of selectors and said pilot being adapted for engagement by the said corresponding selectors.

140. In an accounting apparatus having a tray, a series of pilots, means for movably mounting said pilots in fixed spaced relation in the tray, units of account cards arranged between said pilots, said cards having variant selector-engaging portions, and said pilots being adapted for engagement by said selectors.

In testimony whereof we affix our signatures this 19th day of December, 1919.

LUTHER A. WATTERS.
SAMUEL F. LLOYD.
EDWIN L. RELLER.

pair of selectors and said pilot being adapted for engagement by the said corresponding selectors.

140. In an accounting apparatus having a tray, a series of pilots, means for movably mounting said pilots in fixed spaced relation in the tray, units of account cards arranged between said pilots, said cards having variant selector-engaging portions, and said pilots being adapted for engagement by said selectors.

In testimony whereof we affix our signatures this 19th day of December, 1919.

LUTHER A. WATTERS.
SAMUEL F. LLOYD.
EDWIN L. RELLER.

CERTIFICATE OF CORRECTION.

Patent No. 1,615,806.   Granted January 25, 1927, to

LUTHER A. WATTERS ET AL.

It is hereby certified that the above numbered patent was erroneously issued to "Liberty Systems Corporation", of Wilmington, Delaware, a corporation of Delaware, whereas said patent should have been issued to "Rand Kardex Bureau, Inc.", of Tonawanda, New York, a corporation of Delaware, said corporation being assignee by mesne assignments of the entire interest in said invention; page 9, line 64, for the numeral "143" read "142"; page 10, line 17, for the word "connected" read "connection"; page 11, line 29, for the misspelled word "Unon" read "Upon"; page 13, line 65, for the numeral "239" read "329"; page 19, line 58, claim 114, before the word "audit" insert the word "said"; and that the said Letters Patent should be read with these corrections therein that the same may conform to the record of the case in the Patent Office.

Signed and sealed this 6th day of September, A. D. 1927.

M. J. Moore,
Acting Commissioner of Patents.

Seal.

CERTIFICATE OF CORRECTION.

Patent No. 1,615,806.                                    Granted January 25, 1927, to

LUTHER A. WATTERS ET AL.

It is hereby certified that the above numbered patent was erroneously issued to "Liberty Systems Corporation", of Wilmington, Delaware, a corporation of Delaware, whereas said patent should have been issued to "Rand Kardex Bureau, Inc.", of Tonawanda, New York, a corporation of Delaware, said corporation being assignee by mesne assignments of the entire interest in said invention; page 9, line 64, for the numeral "143" read "142"; page 10, line 17, for the word "connected" read "connection"; page 11, line 29, for the misspelled word "Unon" read "Upon"; page 13, line 65, for the numeral "239" read "329"; page 19, line 58, claim 114, before the word "audit" insert the word "said"; and that the said Letters Patent should be read with these corrections therein that the same may conform to the record of the case in the Patent Office.

Signed and sealed this 6th day of September, A. D. 1927.

Seal.

M. J. Moore,
Acting Commissioner of Patents.